(12) United States Patent
Brown Elliott et al.

(10) Patent No.: US 7,590,299 B2
(45) Date of Patent: Sep. 15, 2009

(54) INCREASING GAMMA ACCURACY IN QUANTIZED SYSTEMS

(75) Inventors: Candice Hellen Brown Elliott, Vallejo, CA (US); Michael Francis Higgins, Duncan Mills, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 244 days.

(21) Appl. No.: 10/866,447

(22) Filed: Jun. 10, 2004

(65) Prior Publication Data

US 2005/0276502 A1 Dec. 15, 2005

(51) Int. Cl.
*G06K 9/00* (2006.01)
*G06K 9/40* (2006.01)

(52) U.S. Cl. ...................... 382/260; 382/107

(58) Field of Classification Search .............. 382/107, 382/108, 260–266, 254
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,800,375 A | 1/1989 | Silverstein et al. |
| 4,853,592 A | 8/1989 | Stratham |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,965,565 A | 10/1990 | Noguchi |
| 4,966,441 A | 10/1990 | Conner |
| 5,006,840 A | 4/1991 | Hamada et al. |
| 5,052,785 A | 10/1991 | Takimoto et al. |
| 5,097,297 A | 3/1992 | Nakazawa |
| 5,144,288 A | 9/1992 | Hamada et al. |
| 5,184,114 A | 2/1993 | Brown |
| 5,196,924 A | 3/1993 | Lumelsky et al. |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |

(Continued)

FOREIGN PATENT DOCUMENTS

DE 299 09 537 U1 10/1999

(Continued)

OTHER PUBLICATIONS

Betrisey, C., et al., Displaced Filtering for Patterned Displays, SID Symp. Digest 1999, pp. 296-299.

(Continued)

*Primary Examiner*—Wesley Tucker
(74) *Attorney, Agent, or Firm*—Haynes and Boone, LLP

(57) ABSTRACT

Embodiments for providing increased gamma accuracy in quantized display systems are herein described. Both system and method embodiments are provided to enhance image quality in three primary and multiprimary display systems.

15 Claims, 19 Drawing Sheets

U.S. PATENT DOCUMENTS

| | | | |
|---|---|---|---|
| 5,438,649 A | 8/1995 | Ruetz | |
| 5,448,652 A | 9/1995 | Vaidyanathan et al. | |
| 5,450,216 A | 9/1995 | Kasson | |
| 5,461,503 A | 10/1995 | Deffontaines et al. | |
| 5,485,293 A | 1/1996 | Robinder | |
| 5,535,028 A | 7/1996 | Bae et al. | |
| 5,563,621 A | 10/1996 | Silsby | |
| 5,579,027 A | 11/1996 | Sakurai et al. | |
| 5,648,793 A | 7/1997 | Chen | |
| 5,739,802 A | 4/1998 | Mosier | |
| 5,754,163 A | 5/1998 | Kwon | |
| 5,754,226 A | 5/1998 | Yamada et al. | |
| 5,808,594 A | 9/1998 | Tsubyama et al. | |
| 5,818,405 A | 10/1998 | Eglit et al. | |
| 5,899,550 A | 5/1999 | Masaki | |
| 5,949,496 A | 9/1999 | Kim | |
| 5,978,509 A * | 11/1999 | Nachtergaele et al. | 382/236 |
| 5,987,167 A * | 11/1999 | Inoue | 382/167 |
| 6,008,868 A | 12/1999 | Silverbrook | |
| 6,034,666 A | 3/2000 | Kanai et al. | |
| 6,064,363 A | 5/2000 | Kwon | |
| 6,064,424 A | 5/2000 | Van Berkel | |
| 6,069,670 A | 5/2000 | Borer | |
| 6,088,050 A | 7/2000 | Ng | |
| 6,097,367 A | 8/2000 | Kuriwaki et al. | |
| 6,108,122 A | 8/2000 | Ulrich et al. | |
| 6,144,352 A | 11/2000 | Matsuda et al. | |
| 6,147,664 A | 11/2000 | Hansen | |
| 6,151,001 A | 11/2000 | Anderson et al. | |
| 6,160,535 A | 12/2000 | Park | |
| 6,188,385 B1 | 2/2001 | Hill et al. | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,243,055 B1 | 6/2001 | Fergason | |
| 6,243,070 B1 | 6/2001 | Hill et al. | |
| 6,278,434 B1 | 8/2001 | Hill et al. | |
| 6,326,981 B1 | 12/2001 | Mori et al. | |
| 6,327,008 B1 | 12/2001 | Fujiyoshi | |
| 6,342,876 B1 | 1/2002 | Kim | |
| 6,348,929 B1 | 2/2002 | Acharya et al. | |
| 6,360,023 B1 | 3/2002 | Betrisey et al. | |
| 6,392,717 B1 | 5/2002 | Kunzman | |
| 6,393,145 B2 | 5/2002 | Betrisey et al. | |
| 6,441,867 B1 | 8/2002 | Daly | |
| 6,453,067 B1 | 9/2002 | Morgan et al. | |
| 6,469,766 B2 | 10/2002 | Waterman et al. | |
| 6,552,706 B1 | 4/2003 | Ikeda et al. | |
| 6,570,584 B1 | 5/2003 | Cok et al. | |
| 6,577,291 B2 | 6/2003 | Hill et al. | |
| 6,614,414 B2 | 9/2003 | De Haan et al. | |
| 6,661,429 B1 | 12/2003 | Phan | |
| 6,674,436 B1 | 1/2004 | Dresevic et al. | |
| 6,680,761 B1 | 1/2004 | Greene et al. | |
| 6,714,206 B1 | 3/2004 | Martin et al. | |
| 6,714,243 B1 | 3/2004 | Mathur et al. | |
| 6,738,526 B1 | 5/2004 | Betrisey et al. | |
| 6,750,875 B1 | 6/2004 | Keely, Jr. et al. | |
| 6,801,220 B2 | 10/2004 | Greier et al. | |
| 6,804,407 B2 | 10/2004 | Weldy | |
| 6,833,890 B2 | 12/2004 | Hong et al. | |
| 6,836,300 B2 | 12/2004 | Choo et al. | |
| 6,850,294 B2 | 2/2005 | Roh et al. | |
| 6,867,549 B2 | 3/2005 | Cok et al. | |
| 6,885,380 B1 | 4/2005 | Primerano et al. | |
| 6,888,604 B2 | 5/2005 | Rho et al. | |
| 6,897,876 B2 | 5/2005 | Murdoch et al. | |
| 6,903,378 B2 | 6/2005 | Cok | |
| 6,937,217 B2 | 8/2005 | Klompenhouwer et al. | |
| 6,995,346 B2 | 2/2006 | Johanneson et al. | |
| 7,123,277 B2 | 10/2006 | Brown Elliott et al. | |
| 2001/0048764 A1 | 12/2001 | Betrisey et al. | |
| 2001/0052897 A1 | 12/2001 | Nakano et al. | |
| 2002/0015110 A1 | 2/2002 | Brown Elliott | |
| 2002/0093476 A1 | 7/2002 | Hill et al. | |
| 2003/0011603 A1 | 1/2003 | Koyama et al. | |
| 2003/0034992 A1 | 2/2003 | Brown Elliott et al. | |
| 2003/0071943 A1 | 4/2003 | Choo et al. | |
| 2003/0072374 A1 | 4/2003 | Sohm | |
| 2003/0090581 A1 | 5/2003 | Credelle et al. | |
| 2003/0146893 A1 | 8/2003 | Sawabe | |
| 2003/0218618 A1 | 11/2003 | Phan | |
| 2004/0008208 A1 | 1/2004 | Dresevic et al. | |
| 2004/0021804 A1 | 2/2004 | Hong et al. | |
| 2004/0061710 A1 | 4/2004 | Messing et al. | |
| 2004/0094766 A1 | 5/2004 | Lee et al. | |
| 2004/0095521 A1 | 5/2004 | Song et al. | |
| 2004/0114046 A1 | 6/2004 | Lee et al. | |
| 2004/0150651 A1 | 8/2004 | Phan | |
| 2004/0155895 A1 | 8/2004 | Lai | |
| 2004/0169807 A1 | 9/2004 | Rho et al. | |
| 2004/0174389 A1 | 9/2004 | Ben-David et al. | |
| 2004/0179160 A1 | 9/2004 | Rhee et al. | |
| 2004/0189662 A1 | 9/2004 | Frisken et al. | |
| 2004/0189664 A1 | 9/2004 | Frisken et al. | |
| 2004/0239813 A1 | 12/2004 | Klompenhouwer | |
| 2004/0239837 A1 | 12/2004 | Hong et al. | |
| 2004/0246278 A1 | 12/2004 | Elliott | |
| 2004/0264795 A1 * | 12/2004 | Fielding | 382/254 |
| 2005/0007539 A1 | 1/2005 | Taguchi et al. | |
| 2005/0024380 A1 | 2/2005 | Lin et al. | |
| 2005/0040760 A1 | 2/2005 | Taguchi et al. | |
| 2005/0068477 A1 | 3/2005 | Shin et al. | |
| 2005/0083356 A1 | 4/2005 | Roh et al. | |
| 2005/0140634 A1 | 6/2005 | Takatori | |
| 2005/0151752 A1 | 7/2005 | Phan | |
| 2005/0162600 A1 | 7/2005 | Rho et al. | |
| 2005/0219274 A1 | 10/2005 | Yang et al. | |

FOREIGN PATENT DOCUMENTS

| | | |
|---|---|---|
| DE | 199 23 527 | 11/2000 |
| DE | 201 09 354 U1 | 9/2001 |
| EP | 0 158 366 A2 | 10/1985 |
| EP | 0 322 106 A2 | 6/1989 |
| EP | 0 671 650 A2 | 9/1995 |
| EP | 0 793 214 A1 | 2/1996 |
| EP | 0 812 114 A1 | 12/1997 |
| EP | 0 878 969 A3 | 11/1998 |
| EP | 0 899 604 A2 | 3/1999 |
| EP | 1 261 014 A2 | 11/2002 |
| EP | 1 381 020 A2 | 1/2004 |
| GB | 2 133 912 A | 8/1984 |
| GB | 2 146 478 A | 4/1985 |
| JP | 60-107022 | 6/1985 |
| JP | 02-000826 A | 1/1990 |
| JP | 02-983027 B2 | 4/1991 |
| JP | 03-78390 | 4/1991 |
| JP | 06-102503 | 4/1994 |
| JP | 2004-004822 | 1/2004 |
| WO | WO 00/21067 | 4/2000 |
| WO | WO 00/42762 | 7/2000 |
| WO | WO 00/45365 | 8/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/086128 A1 | 10/2004 |

WO    WO 2005/050296 A1    6/2005

OTHER PUBLICATIONS

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002, pp. 172-175.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Reducing Pixel Count Without Reducing Image Quality", Information Display Dec. 1999, vol. 1, pp. 22-25.

Credelle, Thomas, "P-00: MTF of High-Resolution PenTile Matrix Displays", Eurodisplay 02 Digest, 2002 pp. 1-4.

Klompenhouwer, Michiel, Subpixel Image Scaling for Color Matrix Displays, SID Symp. Digest, May 2002, pp. 176-179.

Michiel A. Klompenhouwer, Gerard de Haan, Subpixel image scaling for color matrix displays, Journal of the Society for Information Display, vol. 11, Issue 1, Mar. 2003, pp. 99-108.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

Daly, Scott, "Analysis of Subtriad Addressing Algorithms by Visual System Models", SID Symp. Digest, Jun. 2001 pp. 1200-1203.

Krantz, John et al., Color Matrix Display Image Quality: The Effects of Luminance . . . SID 90 Digest, pp. 29-32.

Lee, Baek-woon et al., 40.5L: Late-News Paper: TFT-LCD with RGBW Color system, SID 03 Digest, 2003, pp. 1212-1215.

PCT International Search Report dated Jun. 3, 2002 for PCT/US02/12610 (U.S. Appl. No. 10/051,612).

PCT International Search Report dated Sep. 30, 2003 for PCT/US02/24994 (U.S. Appl. No. 10/215,843).

PCT International Search Report dated Mar. 15, 2006 for PCT/US04/18033 (U.S. Appl. No. 10/455,927).

PCT International Search Report dated Jun. 14, 2006 for PCT/US05/19693 (U.S. Appl. No. 10/696,236).

* cited by examiner

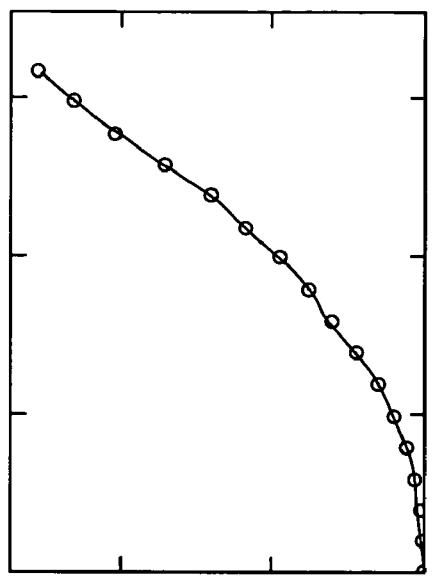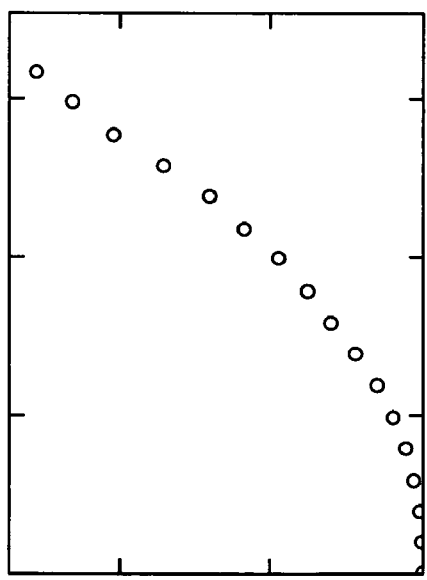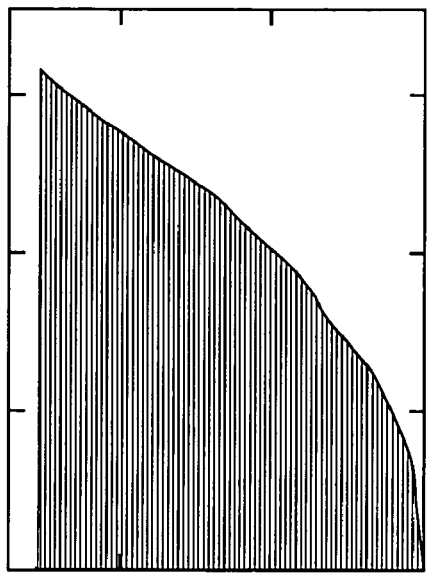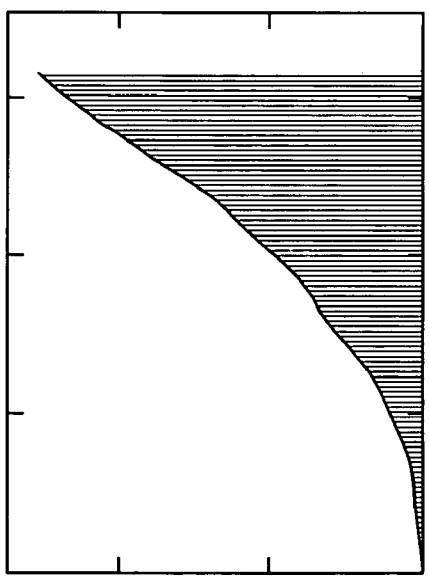
FIG. 4A
FIG. 4B
FIG. 4C
FIG. 4D

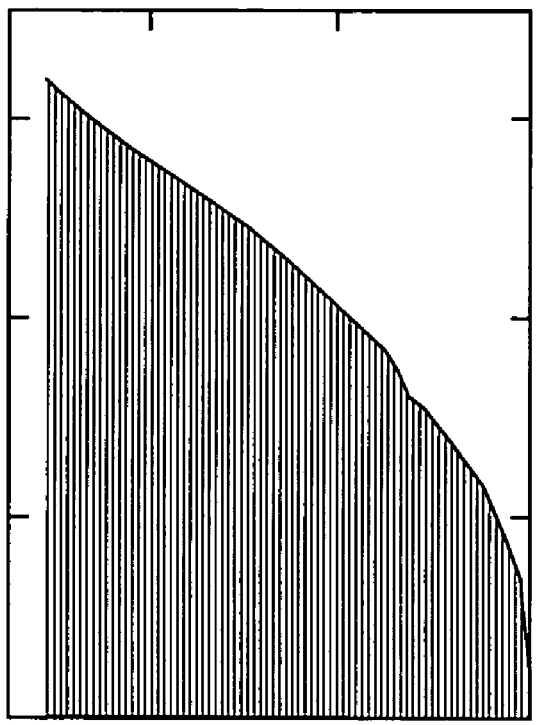
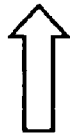
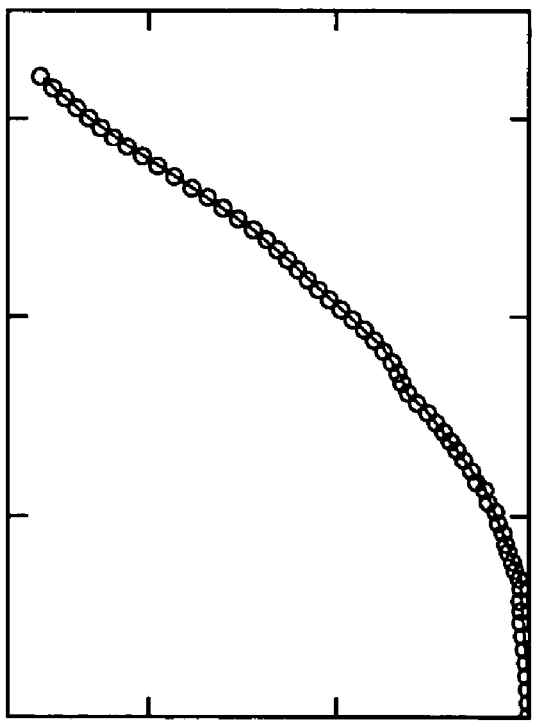
FIG. 5A
FIG. 5B

FIG. 10B

Range: 0-1023(10 bit)

| 256 | 256 | 256 | 256 | 256 | 256 | 256 | 256 |
|---|---|---|---|---|---|---|---|
| 256 | 256 | 256 | 240 | 256 | 240 | 256 | 240 |
| 256 | 256 | 256 | 256 | 240 | 256 | 240 | 256 |
| 256 | 240 | 256 | 240 | 256 | 240 | 256 | 240 |
| 240 | 256 | 240 | 256 | 240 | 256 | 240 | 256 |
| 256 | 240 | 256 | 240 | 256 | 240 | 256 | 240 |
| 240 | 256 | 240 | 256 | 240 | 256 | 240 | 256 |
| 256 | 240 | 256 | 240 | 256 | 240 | 256 | 240 |

| 32 | 32 | 32 | 32 | 32 | 32 | 32 | 32 |
|---|---|---|---|---|---|---|---|
| 32 | 32 | 32 | 32 | 32 | 31 | 32 | 31 |
| 32 | 32 | 32 | 31 | 32 | 31 | 32 | 31 |
| 32 | 32 | 31 | 32 | 31 | 32 | 31 | 32 |
| 31 | 32 | 31 | 32 | 31 | 32 | 31 | 32 |
| 32 | 31 | 32 | 31 | 32 | 31 | 32 | 31 |
| 31 | 32 | 31 | 32 | 31 | 32 | 31 | 32 |
| 32 | 31 | 32 | 31 | 32 | 31 | 32 | 31 |

Range: 0-63(6 bit)

| | | | | | | | |1045|
|---|---|---|---|---|---|---|---|
|32|32|32|32|32|31|31|31|
|32|32|32|32|32|32|31|31|
|32|32|32|32|32|32|32|31|
|32|32|32|32|32|32|32|32|
|32|32|32|32|32|32|32|32|
|32|32|32|32|32|32|32|32|
|32|32|32|32|32|32|32|32|
|32|32|32|32|32|32|32|32|

1040

Range: 0-63 (6 bit)

| 248 | 248 | 248 | 248 | 248 | 244 | 240 | 240 |
|---|---|---|---|---|---|---|---|
| 248 | 248 | 248 | 248 | 248 | 248 | 244 | 240 |
| 248 | 248 | 248 | 248 | 248 | 248 | 248 | 244 |
| 248 | 248 | 248 | 248 | 248 | 248 | 248 | 248 |
| 252 | 248 | 248 | 248 | 248 | 248 | 248 | 248 |
| 256 | 252 | 248 | 248 | 248 | 248 | 248 | 248 |
| 256 | 256 | 252 | 248 | 248 | 248 | 248 | 248 |
| 256 | 256 | 256 | 252 | 248 | 248 | 248 | 248 |

Range: 0-1023 (10 bit)

| 128 | 128 | 128 | 127 | 126 | 126 | 126 | 126 |
|---|---|---|---|---|---|---|---|
| 128 | 128 | 127 | 126 | 126 | 126 | 126 | 126 |
| 128 | 127 | 126 | 126 | 126 | 126 | 126 | 126 |
| 127 | 126 | 126 | 126 | 126 | 126 | 126 | 126 |
| 126 | 126 | 126 | 126 | 126 | 126 | 126 | 126 |
| 126 | 126 | 126 | 126 | 126 | 126 | 126 | 125 |
| 126 | 126 | 126 | 126 | 126 | 126 | 125 | 124 |
| 126 | 126 | 126 | 126 | 126 | 125 | 124 | 124 |

1060

Range: 0-255(8 bit)

| 31 | 31 | 31 | 31 | 31 | 31 | 31 | 31 |
|---|---|---|---|---|---|---|---|
| 31 | 31 | 31 | 31 | 31 | 31 | 31 | 31 |
| 31 | 31 | 31 | 31 | 31 | 31 | 31 | 31 |
| 31 | 31 | 31 | 31 | 31 | 31 | 31 | 31 |
| 32 | 31 | 31 | 31 | 31 | 31 | 31 | 31 |
| 32 | 32 | 31 | 31 | 31 | 31 | 31 | 31 |
| 32 | 32 | 32 | 31 | 31 | 31 | 31 | 31 |
| 32 | 32 | 32 | 32 | 31 | 31 | 31 | 31 |

1055

Range: 0-63(6 bit)

INCREASING GAMMA ACCURACY IN QUANTIZED SYSTEMS

BACKGROUND

In commonly owned U.S. patent applications: (1) U.S. patent application Ser. No. 09/916,232 ("the '232 application"), entitled "ARRANGEMENT OF COLOR PIXELS FOR FULL COLOR IMAGING DEVICES WITH SIMPLIFIED ADDRESSING," filed Jul. 25, 2001; (2) U.S. patent application Ser. No. 10/278,353 ("the '353 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) U.S. patent application Ser. No. 10/278,352 ("the '352 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) U.S. patent application Ser. No. 10/243,094 ("the '094 application), entitled "IMPROVED FOUR COLOR ARRANGEMENTS AND EMITTERS FOR SUB-PIXEL RENDERING," filed Sep. 13, 2002; (5) U.S. patent application Ser. No. 10/278,328 ("the '328 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. patent application Ser. No. 10/278,393 ("the '393 application"), entitled "COLOR DISPLAY HAVING HORIZONTAL SUB-PIXEL ARRANGEMENTS AND LAYOUTS," filed Oct. 22, 2002; (7) U.S. patent application Ser. No. 01/347,001 ("the '001 application") entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, each of which is herein incorporated by reference in its entirety, novel sub-pixel arrangements are disclosed for improving the cost/performance curves for image display devices.

For certain subpixel repeating groups having an even number of subpixels in a horizontal direction, the following systems and techniques to affect improvements, e.g. proper dot inversion schemes and other improvements, are disclosed and are herein incorporated by reference in their entirety: (1) U.S. patent application Ser. No. 10/456,839 entitled "IMAGE DEGRADATION CORRECTION IN NOVEL LIQUID CRYSTAL DISPLAYS"; (2) U.S. patent application Ser. No. 10/455,925 entitled "DISPLAY PANEL HAVING CROSS-OVER CONNECTIONS EFFECTING DOT INVERSION"; (3) U.S. patent application Ser. No. 10/455,931 entitled "SYSTEM AND METHOD OF PERFORMING DOT INVERSION WITH STANDARD DRIVERS AND BACKPLANE ON NOVEL DISPLAY PANEL LAYOUTS"; (4) U.S. patent application Ser. No. 10/455,927 entitled "SYSTEM AND METHOD FOR COMPENSATING FOR VISUAL EFFECTS UPON PANELS HAVING FIXED PATTERN NOISE WITH REDUCED QUANTIZATION ERROR"; (5) U.S. patent application Ser. No. 10/456,806 entitled "DOT INVERSION ON NOVEL DISPLAY PANEL LAYOUTS WITH EXTRA DRIVERS"; (6) U.S. patent application Ser. No. 10/456,838 entitled "LIQUID CRYSTAL DISPLAY BACKPLANE LAYOUTS AND ADDRESSING FOR NON-STANDARD SUBPIXEL ARRANGEMENTS"; (7) U.S. patent application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) U.S. patent application Ser. No. 10/807,604 entitled "IMPROVED TRANSISTOR BACKPLANES FOR LIQUID CRYSTAL DISPLAYS COMPRISING DIFFERENT SIZED SUBPIXELS", filed Mar. 23, 2004.

These improvements are particularly pronounced when coupled with sub-pixel rendering (SPR) systems and methods further disclosed in those applications and in commonly owned U.S. patent applications: (1) U.S. patent application Ser. No. 10/051,612 ("the '612 application"), entitled "CONVERSION OF RGB PIXEL FORMAT DATA TO PENTILE MATRIX SUB-PIXEL DATA FORMAT," filed Jan. 16, 2002; (2) U.S. patent application Ser. No. 10/150,355 ("the '355 application"), entitled "METHODS AND SYSTEMS FOR SUB-PIXEL RENDERING WITH GAMMA ADJUSTMENT," filed May 17, 2002; (3) U.S. patent application Ser. No. 10/215,843 ("the '843 application"), entitled "METHODS AND SYSTEMS FOR SUB-PIXEL RENDERING WITH ADAPTIVE FILTERING," filed Aug. 8, 2002; (4) U.S. patent application Ser. No. 10/379,767 entitled "SYSTEMS AND METHODS FOR TEMPORAL SUB-PIXEL RENDERING OF IMAGE DATA" filed Mar. 4, 2003; (5) U.S. patent application Ser. No. 10/379,765 entitled "SYSTEMS AND METHODS FOR MOTION ADAPTIVE FILTERING," filed Mar. 4, 2003; (6) U.S. patent application Ser. No. 10/379,766 entitled "SUB-PIXEL RENDERING SYSTEM AND METHOD FOR IMPROVED DISPLAY VIEWING ANGLES" filed Mar. 4, 2003; (7) U.S. patent application Ser. No. 10/409,413 entitled "IMAGE DATA SET WITH EMBEDDED PRE-SUBPIXEL RENDERED IMAGE" filed Apr. 7, 2003, which are hereby incorporated herein by reference in their entirety.

Improvements in gamut conversion and mapping are disclosed in commonly owned and co-pending U.S. patent applications: (1) U.S. patent application Ser. No. 10/691,200 entitled "HUE ANGLE CALCULATION SYSTEM AND METHODS", filed Oct. 21, 2003; (2) U.S. patent application Ser. No. 10/691,377 entitled "METHOD AND APPARATUS FOR CONVERTING FROM SOURCE COLOR SPACE TO RGBW TARGET COLOR SPACE", filed Oct. 21, 2003; (3) U.S. patent application Serial No. 10/691,396 entitled "METHOD AND APPARATUS FOR CONVERTING FROM A SOURCE COLOR SPACE TO A TARGET COLOR SPACE", filed Oct. 21, 2003; and (4) U.S. patent application Ser. No. 10/690,716 entitled "GAMUT CONVERSION SYSTEM AND METHODS" filed Oct. 21, 2003 which are all hereby incorporated herein by reference in their entirety.

Additional advantages have been described in (1) U.S. patent application Serial No. 10/696,235 entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003 and (2) U.S. patent application Ser. No. 10/696,026 entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003.

Additionally, these co-owned and co-pending applications are herein incorporated by reference in their entirety: (1) U.S. patent application Ser. No. 10/821,387 entitled "SYSTEM AND METHOD FOR IMPROVING SUB-PIXEL RENDERING OF IMAGE DATA IN NON-STRIPED DISPLAY SYSTEMS"; (2) U.S. patent application Ser. No. 10/821,386 entitled "SYSTEMS AND METHODS FOR SELECTING A WHITE POINT FOR IMAGE DISPLAYS"; (3) U.S. patent application Ser. No. 10/821,353 entitled "NOVEL SUB- PIXEL LAYOUTS AND ARRANGEMENTS FOR HIGH BRIGHTNESS DISPLAYS"; (4) U.S. patent application Ser. No. 10/821,306 entitled "SYSTEMS AND METHODS FOR IMPROVED GAMUT MAPPING FROM ONE IMAGE DATA SET TO ANOTHER"; (5) U.S. patent application Ser. No. 10/821,388 entitled "IMPROVED SUBPIXEL RENDERING FILTERS FOR HIGH BRIGHTNESS SUBPIXEL LAYOUTS"; which are all hereby incorporated by reference. All patent applications mentioned in this specification are hereby incorporated by reference in their entirety.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIG. 4A shows measured points of a display transfer.

FIG. 4B shows an interpolated curve passing through the measured points of FIG. 4A.

FIG. 4C shows the interpolated curve of FIG. 4B sampled at regular intervals along the horizontal axis.

FIG. 4D shows the interpolated curve of FIG. 4B sampled at intervals along the left hand vertical axis.

FIGS. 5A and 5B show an alternate embodiment of producing quantization levels.

FIGS. 10A, 10B, 10C, 10D, 10E, and 10F illustrate image data sets as the image is processed through a gamma pipeline.

DETAILED DESCRIPTION

Figure 1B:
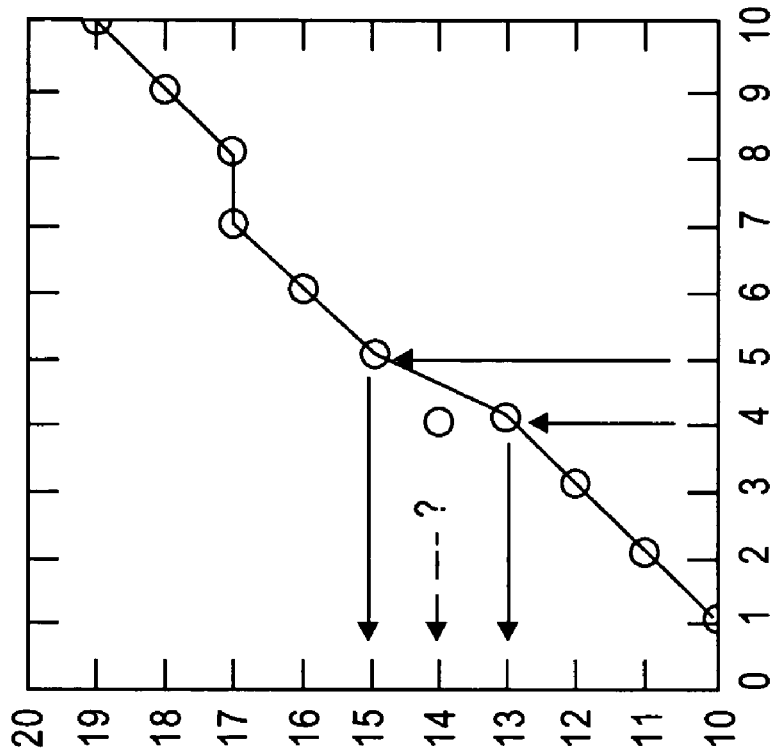
FIG. 1B shows a quantizing function mapping two sequential input values to two output values, skipping an output value.

Quantization of images is used to store the color and brightness data as discrete digital numbers. While it is possible to quantize the brightness levels in linear fashion, it has been found desirable to quantize the data in a logarithmic, or nearly logarithmic, fashion as the Human Vision System responds to an increase in brightness in an inverse logarithmic manner. Such quantizations are sometimes referred to as being "perceptually" quantized. Such quantization may be considered a form of 'perceptually undetectable image compression'. The sRGB gamma standard, for example, is often considered as such a data compression technique.

The human eye and brain experience brightness change as a percentage change, not an absolute radiant energy measurement. As the brightness increases, it takes a larger absolute increase in radiant energy to get a given perceived increase in brightness. This leads to a requirement that for equal perceived increments in brightness, or Lightness, on the screen, each increment of light energy must be logarithmically higher than the last. This curve is given by the following equation:

$L^* = E^{1/Gamma}$, where $L^*$ is the perceived brightness and $E$ is the radiant energy The human eye has a response function, "g", that is approximately $g(x) = x^{1/Gamma} = x^{1/2.2}$. In order to match, or rather cancel this function, the display system has been designed to have a gamma curve, a mathematical function that is the inverse of the eye's mathematical response function, call it "$g^{-1}$". The curve is conventionally called the "Gamma Curve" for the logarithmic term. Displays are designed to use a gamma of approximately 2.2 to approximately fit the logarithmic requirement of the human eye. It was purely fortuitous that Cathode Ray Tubes have a voltage-to-brightness transfer curve that is logarithmic and nearly approximates that desired for image reconstruction of such logarithmic gamma encoded 'perceptually' quantized images. Other display technologies do not naturally fit this logarithmic transfer curve and may have circuits that adjust the transfer curve to approximate that required for reconstructing gamma encoded images. Images that are quantized to expect this non-linear gamma are "perceptually encoded or quantized" as they use a quantizing function based on the eye's response function, "g". The display will transform this non-linear representation into a linear representation.

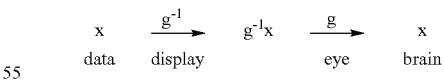

| x | $\xrightarrow{g^{-1}}$ | $g^{-1}x$ | $\xrightarrow{g}$ | x |
| data | display | | eye | brain |

Such perceptually quantized images must be converted to a linear brightness format if they are to be processed by digital algorithms that depend on linearity of the image quantization. Said algorithms may include scaling, subpixel rendering, color gamut mapping, etc. After digital processing, the image(s) are often 'perceptually' requantized to be in the form expected by a display device such as a digital input Cathode Ray Tube (CRT) monitor, Plasma Display Panel (PDP), or Liquid Crystal Display (LCD).

Figure 6:
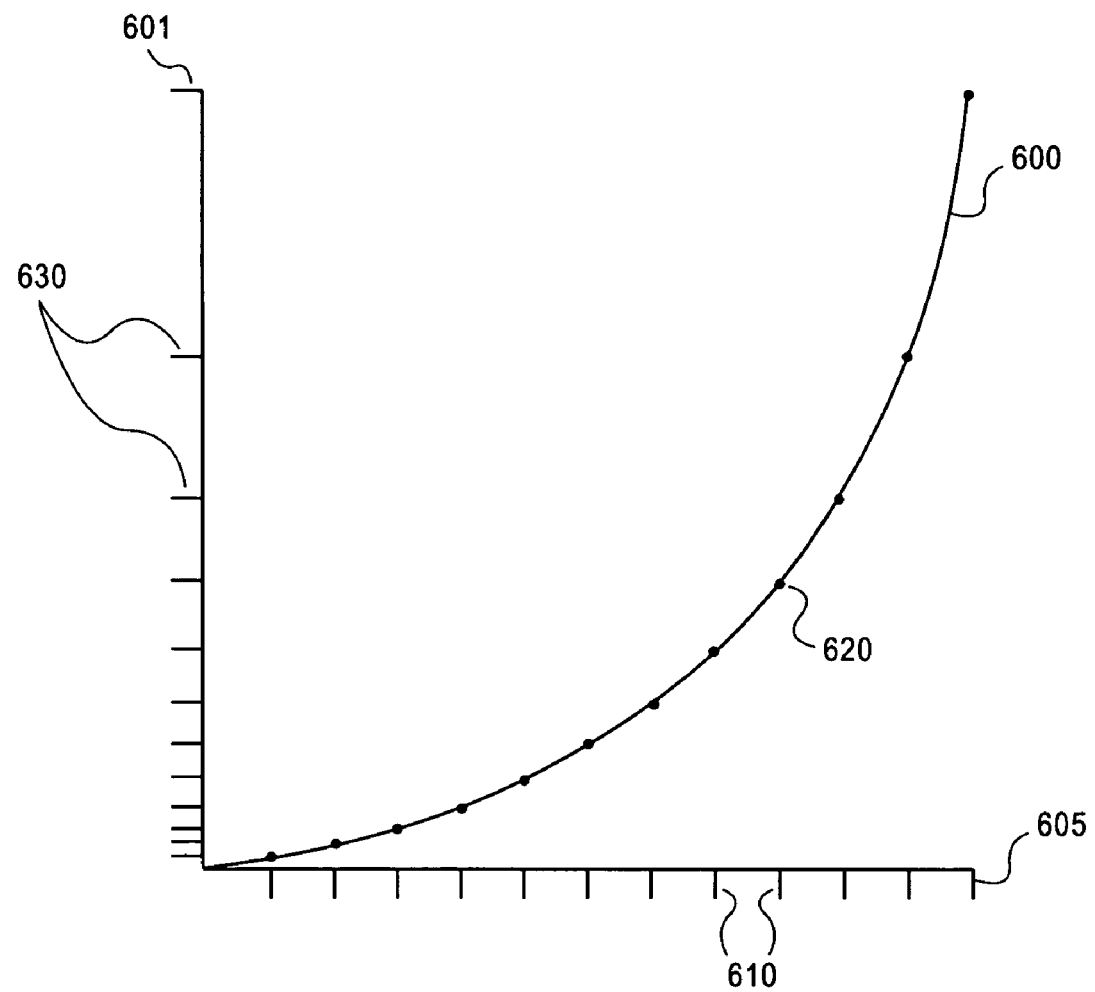
FIG. 6 shows an idealized logarithmic gamma curve with perceptually equal spaced quantized points mapped to perceptually uniformly spaced quantized output energies.

For illustrative purposes, an examination of quantized signal input displays operate in both the ideal case and real world case. Some displays, for example, common Liquid Crystal Displays using operational modes such as Twisted Nematic (TN), SuperTwisted Nematic (STN), Vertical Alignment, Multi-domain Vertical Alignment (MVA), In Plane Switching (IPS), etc, respond to an electrical field such that the optical transmission is continuously variable over a given field strength range. Other displays, such as Light Emitting Diode (LED) and Organic Light Emitting Diode displays (OLED) may be controlled by a given current level or by a temporal duty cycle ratio. FIG. 6 shows the idealized display electro-optical or temporal-optical transfer curve 600 for a display. Equal voltage, current, or time unit intervals 610 are shown on the horizontal axis 605. When a quantized digital signal is mapped to the equal unit intervals 610 on a display with such an ideal transfer curve 600, quantized out levels 620 of the response curve 600 are established, which in turn results in a quantized optical brightness 630 for the display, shown here on the vertical axis 601. Note that the output optical brightness levels 630 increase logarithmically.

Figure 7A:
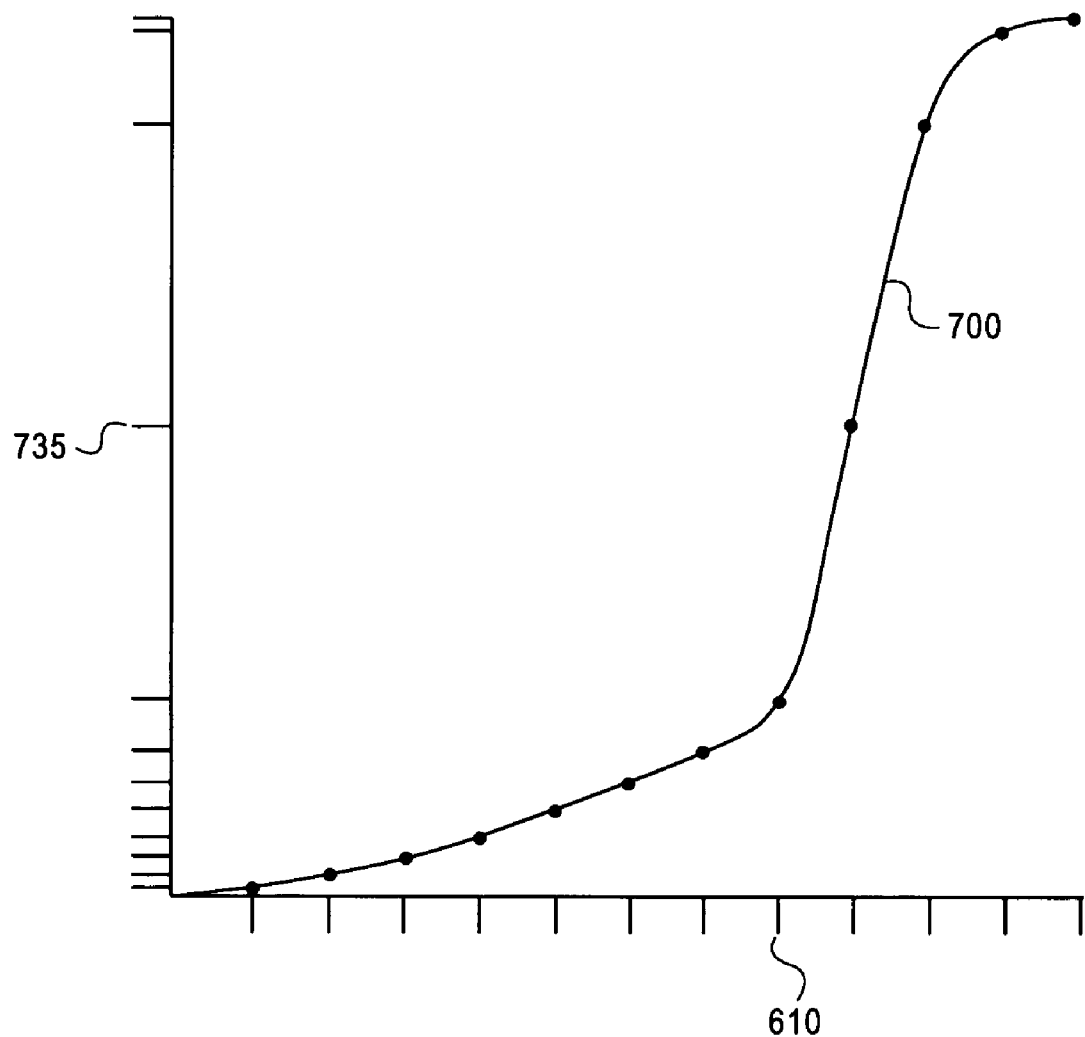
FIG. 7A shows a non-ideal display device transfer gamma curve with equally spaced input values leading to perceptually non-uniformly spaced quantized output energies.

In contrast to this idealized display, most real world display devices have an optical response curve that is not ideal. FIG. 7A illustrates the non-ideal result of using equal unit interval 610 quantized inputs on a display with a non-ideal optical response curve 700. Note that the quantized optical brightness levels 735 are not distributed in a logarithmical relationship.

Figure 7B:
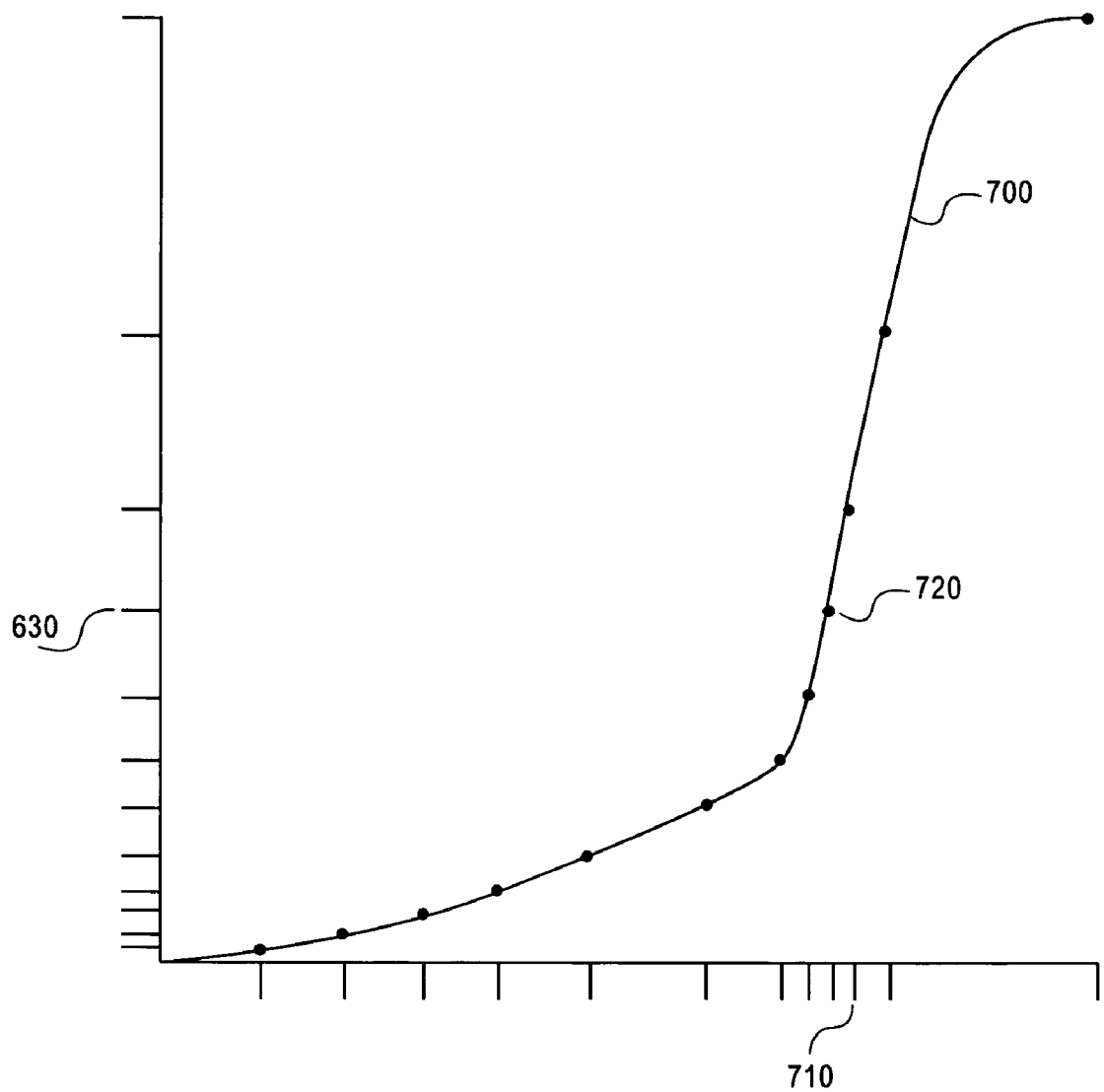
FIG. 7B shows the non-ideal display device transfer gamma curve of FIG. 7A with non-uniformly spaced input values leading to perceptually uniformly spaced quantized output energies of FIG. 6.

This non-ideal display may be driven by non-equal interval quantized inputs 710 as illustrated in FIG. 7B. These quantized input values are carefully chosen or adjusted such that the resulting points 720 on the non-ideal transfer curve 700 maps to the desired quantized optical brightness levels 630. In some prior art, voltage driven, Active Matrix Liquid Crystal Displays (AMLCD), these levels have been approximately adjusted by using drivers with external resistor ladders that provide reference voltages to a display driver integrated circuit. Since a driving integrated circuit may have 65 or 256 analog voltage output levels, it is prohibitively expensive to provide an externally adjustable resistor ladder with the same number, as there must be a corresponding number of input pins to allow the reference voltages to be tapped. Therefore, it is common practice to use resistor ladders with a reduced number; sixteen being a common choice. This results in the adjustment of the quantized output values to be accurate only for those values that are directly mapped from the reduced number of external reference voltages. The output values between each of the externally referenced values are equal unit interval interpolated by an internal resistor network in the display driver. Since the intrinsic transfer curve 700 is a reasonable approximation of the desired ideal transfer curve 600 in the lower brightness region, it follows that the adjusted quantized optical outputs are piecewise approximately following the desired logarithmic values in the lower brightness region. However, the values between the externally referenced values are not ideally quantized, especially in the higher brightness region. Unless this error is compensated in some manner, artifacts in the image reconstruction will be visible to the human observer.

Starting from the display and working our way backwards may seem to be just that, but it is easier to understand the rationale for each component's function for merely expository purposes, and not thereby limiting the present invention. It may be desirable to have the brain see the data that was in the original image "x", that has been perceptually encoded, but it may be digitally processed as "$x_p$." The human eye has a response function, "g", that is approximately $g(x)=x^{1/Gamma}=x^{1/2.2}$. In order to match, or rather cancel this function, the graphics system (but not necessarily the display itself) may be designed to have a gamma curve, a mathematical function that is the inverse of the eye's mathematical response function, call it "$g^{-1}$". When convoluted by the eye, $g^{-1}x_p$ becomes $x_p$. As noted earlier, the display gamma interferes with the linear digital processing algorithm. To achieve the linear display system, the function of the display "f" may be identified and a gamma correction, or rather cancellation function, "$f^{-1}$", may be generated to be the inverse of f. This function may be applied after linear digital image processing, but before the display. This insures that the processed data, with the proper gamma curve that matches the eye reaches the eye undisturbed by the display. But where does a system implement the proper gamma term $g^{-1}$? It may not be desirable after linear digital processing; therefore, it may be right before, in a precondition step. Thus, there is the full data pipeline shown below.

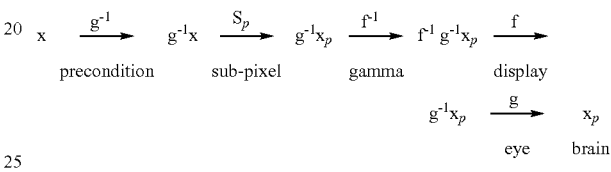

With the gamma pipeline in place, linear digital processing should produce substantially the right color balance and brightness expected from the system.

In practice, data may be stored in files in a "perceptually quantized" gamma compressed N bit form and converted, through an input gamma look-up-table into an uncompressed, linear, form which may require more bits of precision, N+X bit. Color experts argue about how many bits of precision are necessary to avoid errors. It may be that the number of errors drop off asymptotically as more internal bits are used; but it might take an unacceptably large number of bits of precision to ensure that the error reached zero. Non-zero error in the gamma pipeline may result in banding, or contouring, in images that may be noticeable and possibly objectionable.

Examining the flow of data through the gamma pipeline, it should be appreciated that that the system may have the potential—using different functions for the linearizing preconditioning step and the output quantization, display gamma correction step—of using non-ideal displays and yet achieve substantially ideal results. However, because the system may be operating upon quantized images, the system might be constrained by mapping issues. For example, many displays are capable of displaying 256 levels of grey, which would be represented by an 8 bit digital value, matching the 8 bit quantization of many digital image formats. If the two functions $g^{-1}$ and $f^{-1}$ are dissimilar, and no other steps are taken to ameliorate the problem, there will be an issue of mapping an input value to the output value, no matter how many bits of precision are used in between. If they are inverses of one another, some of the input values may map to the same output values, while some of the output values may not have an input value mapped to them, that is to say, that these output values are 'skipped'. This error in the gamma pipeline may result in severe banding, or contouring, in images that may be very noticeable and objectionable.

Therefore, it may be desirable to provide for improved gamma accuracy of digital image processing display systems while maintaining commercially reasonable bit depth representations in the linear domain for said digital image processing. Additionally, it may be desirable to provide increased grey level capability of digital image processing display systems while maintaining commercially reasonable bit depth display drivers.

One possible embodiment to the mapping problem is to use matched input and output gamma curves that are exact inverses of each other. Three alternative embodiments are possible. The first embodiment is to use an arbitrary function and its inverse. But this may not satisfy the criteria of matching either the quantization function of the input image or the display function. The other two embodiments may be to match either the input image quantization function or the display function.

In yet another embodiment, instead of using the expected input gamma curve, a scaled and interpolated version of the measured display gamma curve may be used as the input gamma table. Then an inverted version of the measured monitor gamma curve may be used to generate the output gamma table. This may have the merit of providing linearity of the display response after digital processing, ensuring that color balance is substantially correct for those algorithms that depend on this linearity (e.g. subpixel rendering and color gamut mapping).

Characterizing the display gamma curve may be performed from a set of floating point measurements of a subset of the greyscale values, shown in FIG. 4A. Curves (e.g. cubic or the like) may be constructed to pass through all the measured points as in FIG. 4B. The input and output curves may be generated from this single mathematical curve as shown in FIGS. 4C and 4D.

Figure 1A:
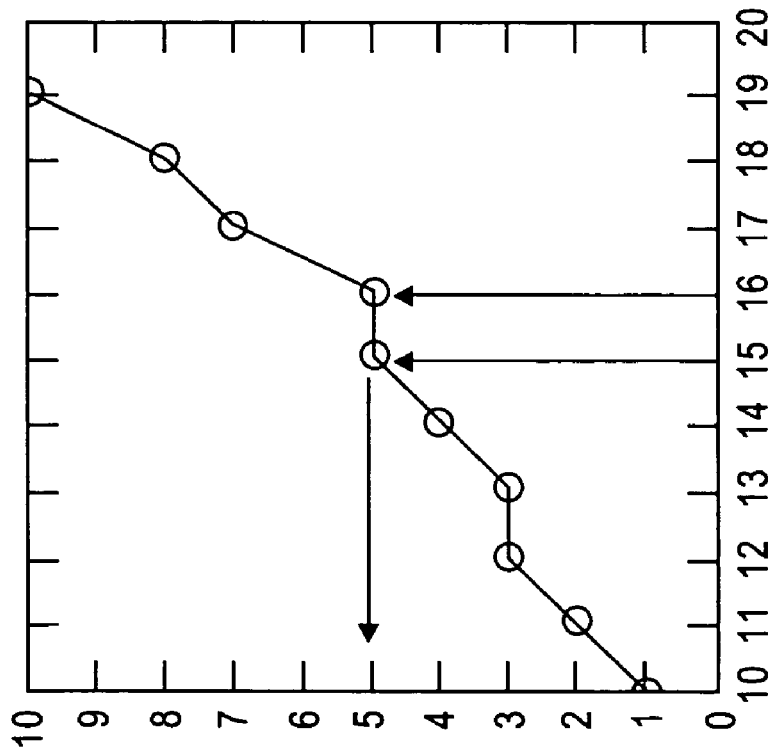
FIG. 1A shows a quantizing function mapping two sequential input values to one output value.

Because display gamma curves are often reasonably close to an sRGB gamma curve, the input gamma conversion may be a reasonable approximation of linearity. Since the two curves could be built to be substantially inverses of each other, the number of errors due to mapping issues should be small. Unfortunately, some errors may still appear at any reasonable precision. One reason for this might be that the curves are never "exact inverses" of each other when they are truncated to integer values for building gamma look-up-tables. One result may be that the near flat start of the input gamma curve may map several input values to one intermediate value and the original differences in the data are lost in this area. FIG. 1A shows a section of an input gamma table where this problem occurs. Another result might be that the near vertical start of the output gamma curve maps consecutive intermediate values to very different output values, skipping output numbers that are then never used. FIG. 1B shows a section of an output gamma table where this problem occurs. One embodiment to alliviate either of these problems, and similar problems at the end of the curves, is to increase the number of bits of precision in the output of the input gamma curve. This causes an increase in the precision of the processing and an increase in the size of the output gamma table, making it more expensive to implement. Below are shown procedures for reducing the error to zero while still keeping the table sizes small.

Control the Starting Slope of the Gamma Curve.

One embodiment is to modify the start of the input gamma curve so that it has a desired slope greater than being zero or substantially flat—for one example, about a slope of approximately one or more after scaling and converting to integer. The sRGB standard does have a similar requirement that the start of the curve always be linear, so that in modifying the input gamma conversion table, it becomes a hybrid of that matched to the input image quantization and that matched to the display. Of course, it will be appreciated that the desired slope may be any value greater than or less than one, depending upon the desired response of the system to quantization effects or the like. Additionally, it may be appreciated that other parts of the curve may also be linearized as well.

Many display systems store a single channel of color as an 8 bit value which can range from 0 to 255. This means the input gamma table must have 256 different internal values in it. Each of these internal values are usually larger than the input range. One common size for the internal values is 12 bits deep resulting in a range of 0 to 4095. Thus, in one example, if the input gamma curve was a linear straight line in this integer representation, it would have a slope of 4095/255 which is already greater than one.

However, the typical display gamma curve starts out with a very small slope and increases from there, inverting the logarithmic response of the eye. When the internal precision of the gamma pipeline is large enough, for example 12 bits deep or more, the slope of the integer input gamma table can, for example, start greater than 1.0 and these errors are less likely to happen. In cases were the slope is already 1.0 or greater, the start of the input gamma table does not need modification. However, when the number of internal bits is low, 11 bits or less for example, the slope of the integer curve can be less than one. According to one embodiment, this slope may be modified to have the value of 1.0. Note that the precision "breaking" point at 11 or 12 bits is an example that is true of a curve which has a gamma of about 2.2 on the whole. Other curves with different gamma may have the slope change from less than to greater than 1.0 at a different precision.

It should be appreciated that the starting slope may be addressed in different ways in many possible embodiments. In some cases, one may use mathematically defined curves with a single gamma such as 2.2 or compound mathematical curves like sRGB. In these mathematical cases, one may add a linear section to the start of the curve with a desired slope in a manner similar to how the linear section is normally added to an sRGB curve. The power section of the curve after the linear start may be modified until its slope starts out with a desired value (e.g. substantially not flat) before curving up. This results in a curve that has substantially no sudden changes in the slope that might be noticeable in test images.

The resulting composite curve, linear married to curving, will have a slightly different composite gamma value. The curvature of the power section can then be modified until the composite gamma approaches the desired value again (usually 2.2). For example, the power section of sRGB actually has a gamma of 2.4 but when combined with the linear section at the start the composite gamma is 2.2.

Figure 2B:
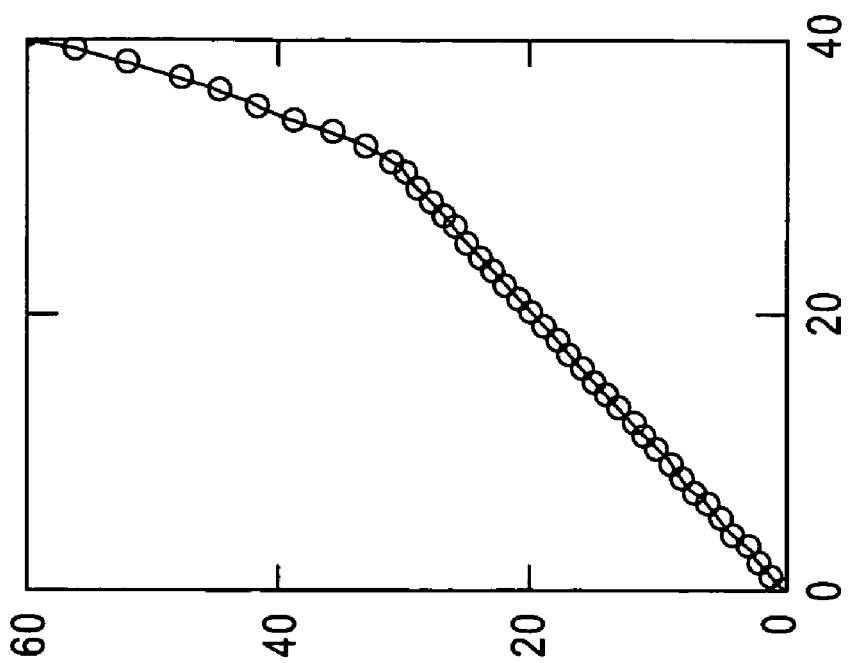
FIG. 2B shows an input gamma function mapping the lower end in a linear manner to avoid mapping multiple input values to the same output value.
Figure 2A:
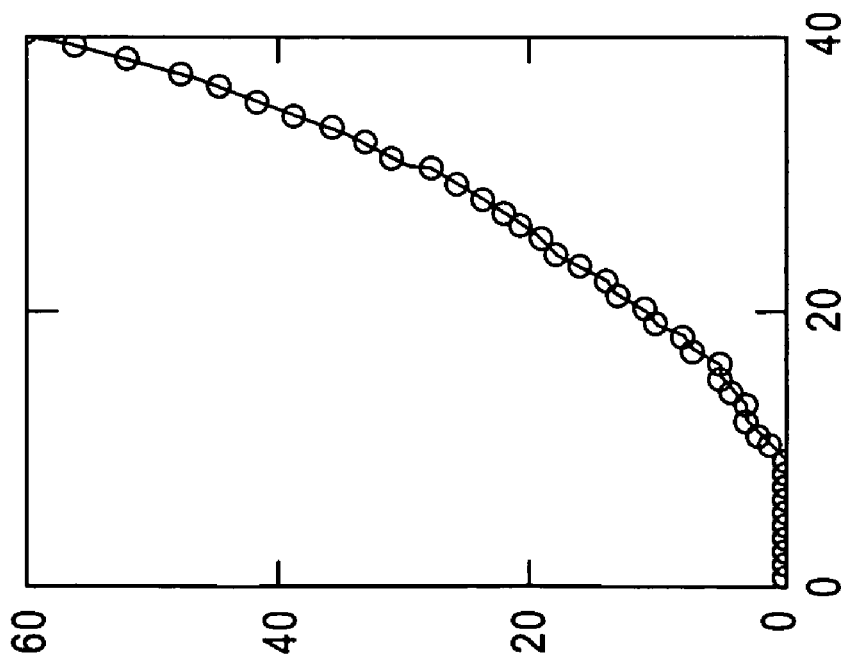
FIG. 2A shows an input gamma function mapping the very low input values to zero in the expanded value domain.

When using measured gamma curves from displays as the input gamma, a mathematical function may not always be available to modify in the above manner. In this case, scaling the measured input gamma to the required range and then modifying the start of the curve to have a desired slope by replacing the contents of the input gamma table with the index is performed. Since the slope of the input gamma curve is increasing, there will eventually be a point where the slope was already at the desired value or greater and the process may stop. At reasonably high internal precision this process only modifies the first few values of the input gamma curve. FIGS. 2A and 2B show the starting section of an input gamma curve before and after performing this linearization step.

When the precision is low more values have to be modified. For merely one example, in the case of a 6 bit input gamma table with 8 bit internal values, for a gamma of 2.2, the first 20 values may be modified. This is about a third of the 64 possible input range, and may probably result in other image defects. The effect of linearizing the start of the gamma curve to a slope of 1.0 means that the dark end of the color range may not be gamma corrected. This should not be a problem when concerning only the first few very dark values. When the precision is too low, it may mean disabling gamma over an unacceptably large range of dark to medium colors.

Round-Off Errors

If the above linearizing procedure is done, or if linearizing turns out to be unnecessary, errors may still appear. These errors are of a different type and result from the way inverse gamma curves are generated and truncated to integer values. One may use a Catmul-Rom cubic or other suitable interpolation technique to construct a curve that passes through all the measured points on the output gamma curve. The curve may be scaled and sampled at any rate to generate an input gamma curve with any number of interpolated samples. Because cubic curves are parametric, one may also sample it on the other axis to generate the inverse gamma curve. These two mathematical operations should produce tables that are substantially inverses of each other, if one stores the results as floating point numbers. The rounding and truncation operations performed to convert these to integers effectively make decisions about when to step the curves up to the next integer value. Unless care is taken, the decisions made on the input curve happen at different places than in the output curve and these steps may beat against each other.

Figure 3A:
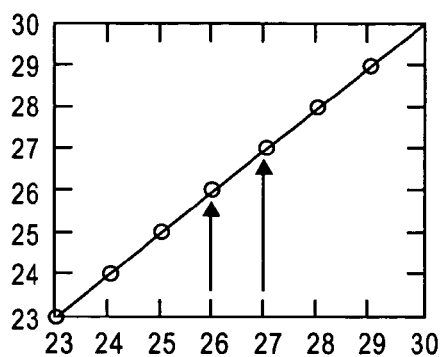
FIGS. 3A, 3B, 3C, and 3D show a subset of an input gamma function map and its subsequent processing.
Figure 3B:
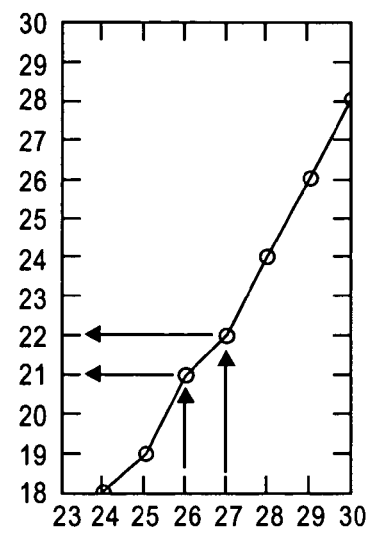
Figure 3C:
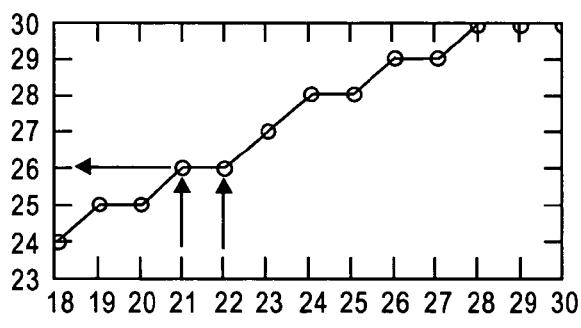
Figure 3D:
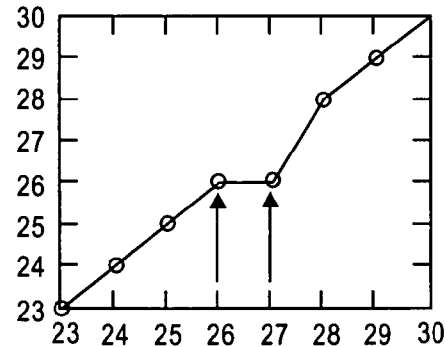

To illustrate these errors, FIGS. 3A, 3B, 3C and 3D show a small section of an input ramp, one possible input gamma table, a possible corresponding section of the output gamma table, and the resulting output ramp respectively. It is desirable for the final result to exactly match the starting ramp of FIG. 3A. These input values may be fed into the exemplary input gamma table in FIG. 3B. If the output from this table is not modified by internal processing, then the results are fed into the output gamma table in FIG. 3C. Flat spots in this curve may be expected, but it may not be desired for two adjacent values from the input gamma curve to land on the same flat spot in the output gamma curve. The result is errors in the final output as shown in FIG. 3D. The normal rounding and truncating of the two curves results in these occasional dips and jumps in the final ramp that are visible in displayed images.

Compensating for Round-Off Errors

Many possible embodiments are possible to alleviate these round-off problems. One possible embodiment may be to hand-tune the output gamma curve. Looking at FIG. 3C, it is easy to see that moving sections of the curve left or right by one (left in this case) may remove the error in FIG. 3D without introducing any other error in this section of the curves. Another embodiment may change the manner in which the output gamma curve is rounded to integers. Rounding the floating point values up by a desired value (e.g. at approximately 0.5), for merely one example, would move sections of the curve up by one which could have the same effect as shifting sections of the curve left or right. This may create errors in other parts of the curve while removing them in some. A third embodiment may be to build the output gamma curve from an integer copy of the input gamma curve.

Yet another embodiment is to change the procedure shown in FIGS. 4A through 4D. The final step of FIG. 4D is replaced with the steps shown in FIGS. 5A and 5B. In FIG. 5A, a new curve may be generated from the integer results of FIG. 4C. In the final step shown in FIG. 5B, it is possible to generate the output gamma curve from the second curve of FIG. 5A, instead of directly from the first curve of FIG. 4B. One may use a Catmul-Rom cubic curve that may substantially pass through all the data points. Using the integer input curve as the data points for a second cubic curve may allow that the resulting output gamma curve does hit substantially, if not all, the input gamma points. Then the input and output tables are possible better matched inverses of each other.

In yet another embodiment, linearizing the slope of the input gamma data to a desired value may be accomplished before using it to generate a second curve for the output gamma table. One may use a computer program that optionally does all these steps and checks to make sure there is no error in the resulting matched tables. Since linearizing the stating slope to a desired value may not always be desired, this step may be a selectable option. Since there are cases when matched gamma tables are not used, the program has the option to build the output gamma curves directly from the measured data, as in FIGS. 4A-D, and/or 5A-B. This form of output gamma curve may be used when we are using the standard sRGB input gamma curve instead of a matched input gamma table.

In yet another embodiment, the mapping problem may be solved by using a gamma Look Up Table (LUT) or other gamma function generator to directly control the display output brightness quantization values. In one embodiment, a display device that has a linear output brightness response to a Pulse Width Modulated drive voltage or current may have its PWM duty cycle controlled by the gamma function generator. For example, in systems, such as Organic Light Emitting Diode Displays, that are current driven, emitting light is in proportion to the total instantaneous current flowing through them. Looking at the data sheet for a commercially available OLED driver, CLAIRMicronix part #MXED102, a 240 channel Column Driver chip, indicates that it uses a constant current, Pulse Width Modulation, grayscale system, in which down-counters for each channel are latched with data values, then a clock is pulsed, counting down the increments while the current is applied to the display, until the counter hits zero, at which time that channel is turned off.

Most clocks are constant interval. But, if one used a non-constant interval, shorter at first, lengthening as it ramped down, one can implement a gamma adjusted clock to control the PWM to apply a suitable gamma to the display to provide the non-linear gamma needed to create picture quality images.

Figure 13:
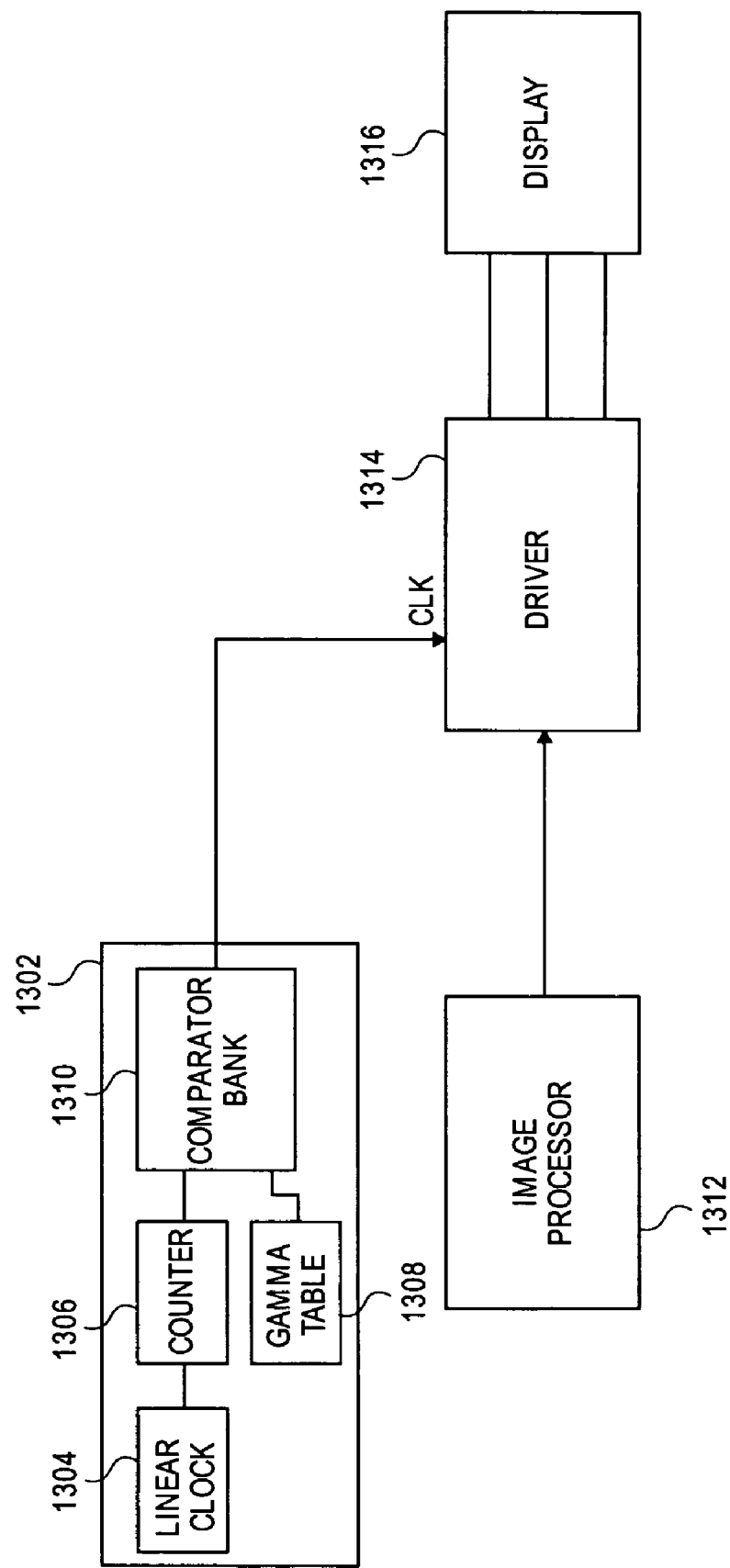
FIG. 13 shows a block diagram of a gamma clock in a display system.

One embodiment shown in FIG. 13 that provides a flexible gamma clock 1302 may use another counter, up or down, 1306 feeding a digital comparator bank 1310. Each comparator therein is fed a number from a gamma table 1308, the numbers having been generated from the expected perceptual quantization function, such as sRGB. When the clock count from 1306 equals a value from the table, the comparator sends a clock signal to the driver 1314. Driver 1314 may also input signals from image processor 1312 and appropriate process signals to drive display 1316.

There could be as many digital comparators in 1310 as there are grey levels in the drivers. The bit depth of the gamma counter 1306 may be made arbitrarily larger in the gamma clock generator, improving accuracy of the gamma curve. The gamma clock table and the gamma-pipeline for the subpixel rendering data path lookup tables may have substantially the same or the inverse values. Alternatively, the gamma clock counter may be fed by a suitably faster, but linear, constant interval, clock. By calculating and storing values in the table, any desired gamma curve may be placed onto the PWM device.

Using substantially the same bit depth in the gamma tables, as may be used in a subpixel rendering engine input (gamma "preconditioning" table output), may result in substantially zero low spatial frequency grayscale passthrough error. Thus, an image processing algorithm—depending on the linearity of the grey scale encoding—may be performed in linear space and transposed for non-linear gamma display on a "linear" OLED or other suitable PWM driven display where the gamma may be controlled by the subpixel rendering controller.

In yet another embodiment, the mapping problem may also be solved in part by increasing the number of available quantized output values. If the number of output values exceeds the input values, then the transfer functions in and out of the digital processing system may be different without mapping two input values to the same output value. Some of the output values may be skipped, but the number of output values used may substantially equal the number of input values. In addition, should the digital processing algorithm or process within the gamma pipe create internal values that were not directly mapped from an input value, this internally generated value may map to an output value that an input value does not directly map. This property may be useful, as many digital processing algorithms and processes create such new values—the value of which carries information that, when observed by a human viewer, conveys information.

An example is provided herein as merely illustrative of the usefulness of this property without limiting the scope of the present invention. When mapping conventional image data sets to a subpixel rendered data set (perhaps by using the methods described in some of the patent application incorporated by reference), high spatial frequency image components that might alias with the subpixel structure of the target color subpixelated display are removed, filtered out. The result at any point of the image may be a value of the lower spatial frequency components. When re-quantized to the same bit depth as the original image, even using the methods of constructing gamma functions taught above, objectionable artifacts may occur.

Giving an even more specific example for illustrative purposes; a portion of six (6) bit image data set 1010, shown in FIG. 10A, with part of the image alternating between two sequential quantized values may be transformed by the first input gamma function to become the ten (10) bit internal image data set 1020 shown in FIG. 10B. This would in turn be filtered, or averaged, by a filter kernel, such as shown in the table directly below, resulting in the filtered image data set 1030 shown in FIG. 10C.

| | | |
|---|---|---|
| −0.0625 | 0.125 | −0.0625 |
| 0.125 | 0.5 | 0.125 |
| −0.0625 | 0.125 | −0.0625 |

Note that the high spatial frequency energy in the diagonal axis that was present in the original 1010 and transformed 1020 image data sets has been filtered, leaving a low spatial frequency slope. If this internal image data set is then perceptually, logarithmically re-quantized back to six (6) bit, 64 levels, then depending on the round off, high or low, two possible image data sets 1040 and 1050 may result, shown in FIGS. 10D and 10E respectively. Note that the images in these data sets 1040 and 1050 show a contour or edge 1045 and 1055 that is not in the center of the slope, but at one edge or the other. This would be visible as an objectionable artifact. This artifact is known as quantization noise. The noise is the difference between the desired signal and the actual signal. However, if the filtered image data set 1030 is perceptually quantized to eight (8) bit, the result would be the eight (8) bit output image data set 1060 illustrated in FIG. 10F. Note that the image 1060 is smooth, with values that represent each different value present in the filtered internal image 1030. In this final example, there is no quantization noise.

The advantage of reduction of quantization noise may be considerable when a system uses lower grey scale drivers than the incoming data provides. However, even for systems that use the same grey scale bit depth as the incoming data of the system, benefits may be seen in better control of the overall transfer function (gamma), by allowing an input gamma adjustment means (LUT or other function generator) to set the display system gamma, while the output quantizers exactly match and complement, thus cancel the transfer function of the actual display device, with fidelity greater than the bit depth of the drivers due to the added benefit of the reduction of quantization noise. Thus, one may have an input transform that converts the incoming data to some arbitrarily larger bit depth, followed by any optional data processing such as scaling or subpixel rendered, if desired. This may be followed by conversion via the matched output transform to the display device with greater bit depth, higher number of quantized levels, than the incoming dataset. Additional embodiments for increasing the number of quantized output levels are discussed further below.

Fixed Pattern Noise w/Matching Quantizer Look-Up Tables

Some panels exhibit a fixed (e.g. non-moving) pattern noise in which the Electro-Optical (EO) transfer function for a subset of the pixels or subpixels is different, perhaps shifted, from (an)other subset(s). This fixed pattern noise, if uncompensated, may cause an objectionable image if the differences are large. However, even these large differences may be used to advantage to reduce quantization noise artifacts such as false contours, usually caused by insufficient grey scale depth.

Figure 9A:
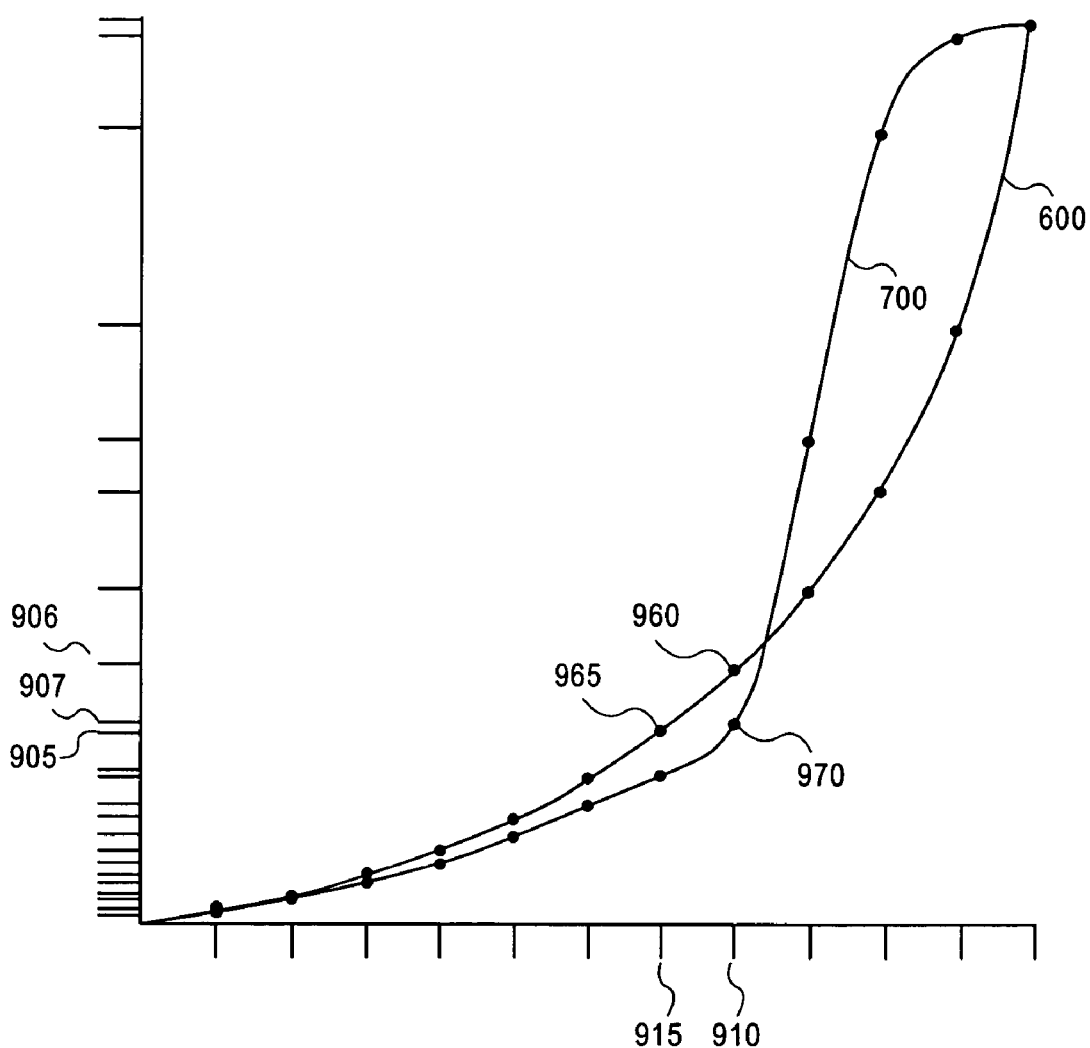
FIG. 9A shows the idealized gamma curve of FIG. 6 and the non-ideal gamma curve of FIG. 7A together as an illustration of fixed pattern noise caused by two gamma curve present in the same display.

For illustrative purposes, an example is given here; FIG. 9A shows two transfer curves 600 and 700 both present on the same display, one curve 600 being close to ideal, the other curve 700 being further from ideal. Each curve corresponds to a subset of pixels or subpixels on the display. For illustrative purposes, let us assume that half of the subpixels of each color have the near ideal transfer curve 600, while the other half have the non-ideal transfer curve 700. Further, these subpixels are evenly distributed and intermixed across the display. At a given quantized input level 910, two points 960 and 970 are selected on the transfer curves 600 and 700 respectively. These points 600 and 700 map to two output brightness levels 906 and 907 respectively. This difference in output level means that there is a fixed pattern of brightness on the display that is not the desired image signal. The difference between the desired image signal and the actual signal is the fixed pattern noise.

Since the pattern noise is predictable, measurable, one can provide separate quantizers for each subset of pixels or subpixels, matched to the EO transfer function of each subset. The quantizer in a digital system is often a look-up table (LUT), or other function generator, that converts a greater bit depth value to a smaller bit depth value. The large bit depth value may be for linear digital image processing or it may not. The large bit depth value may be in a linear luminance space (encoding) or any arbitrary space (encoding). With separate quantizers, one may compensate for the fixed pattern noise, as illustrated in FIG. 9A. With a separate quantizer for the subset of subpixels with the near ideal transfer curve 600, a given internal value is mapped to a display input value 915 which selects a point 965 on the curve 600 which, in turn, maps to an optical output brightness level 905. A separate quantizer for the other subset of subpixels with the non-ideal transfer curve 700 may map that same said given internal value to a different display input value 910 which selects a point 970 on the non-ideal curve 700 which maps to an output brightness level 907 that lies close to the first output brightness level 905. Thus, the fixed pattern noise amplitude may be reduced.

Figure 9B:
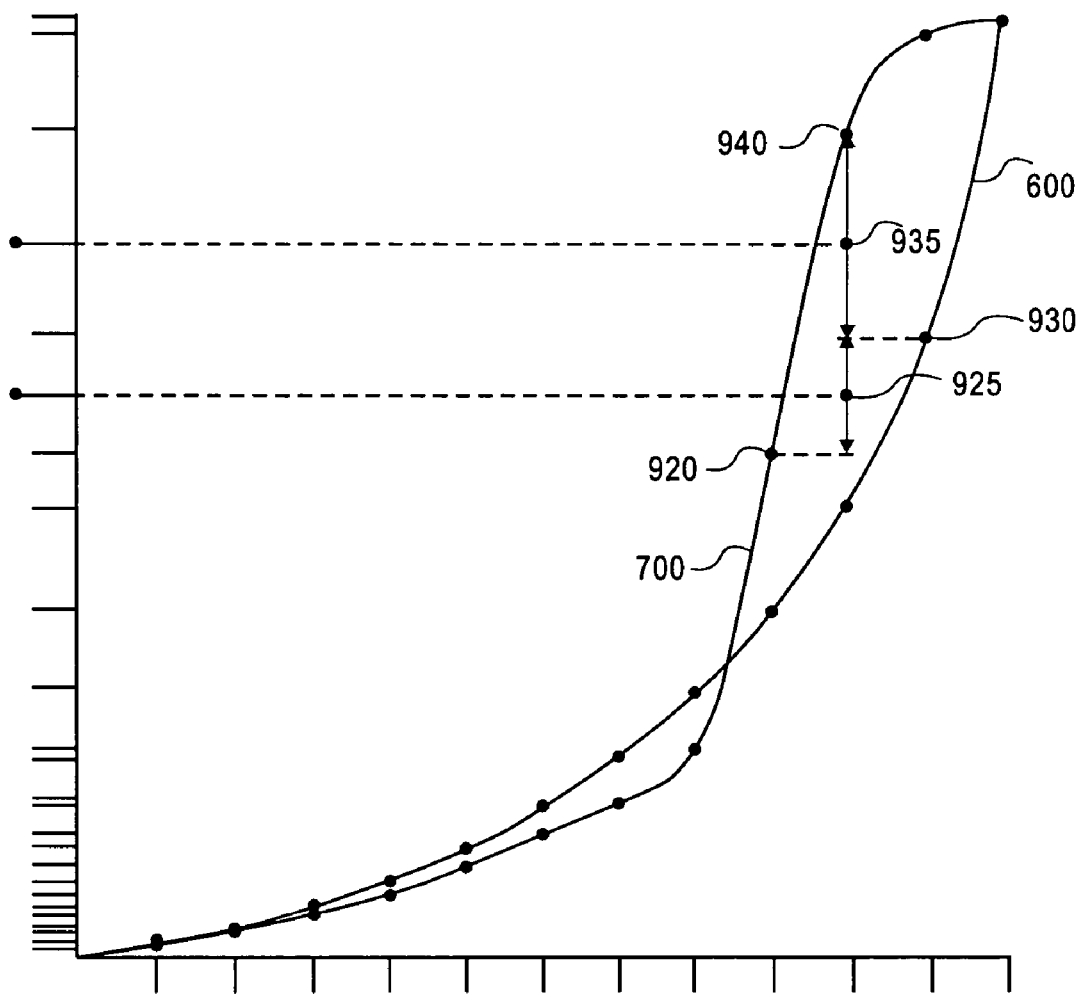
FIG. 9B shows the fixed pattern noise of FIG. 9B used to increase the grey scale capability and thus decrease the quantization error of a display.

Having separate LUTs not only compensates for the separate transfer curves, reducing fixed pattern noise, but since each combination of subpixel subset and LUT quantizes with different round-off (changes output) at different internal value inputs, the effective grey scale of the display system is increased. Fixed pattern noise, when present in moderate amounts, is filtered, averaged, by the Human Visual System. For each brightness level on one subset of pixels or subpixel with a given transfer curve, there may be one or more output brightness levels of another subset of pixels or subpixels with a different transfer curve that switch states within the range of internal values that map to the first said brightness level. Each of these possible combinations of brightness levels from the subsets of pixels or subpixels with different transfer curves will be perceived by the Human Vision System as a different grey scale level. This property is illustrated in FIG. 9B. A group of pixels or subpixel set at given brightness given by the quantized point 930 on the first transfer curve 600 may be combined with either a group of pixels or subpixels at either the quantized point 920 or 940 on the second transfer curve 700 to produce an intermediate brightness level at 925 or 935 respectively. In this illustration, not every quantized point on the first transfer curve 600 is doubled, however in the general case, this technique will come close to doubling the number of effective brightness levels available on the display.

The subsets need not be quantizing exactly out of step, nor uniformly out of step, for improvement to be realized, though it helps if they are. The number of subsets may be two or more. More subsets increases the number of LUTs, but also increases the benefit of the quantization noise reduction and increased grey scale reproduction since each subset would be quantizing at different input levels, which increases the total number of effective brightness levels available on the display.

In yet another embodiment, it may be advantageous to deliberately introduce fixed pattern noise, using two or more subsets of EO transfer functions per subpixel color. Since green is usually responsible for the largest percentage of luminance perception, having multiple subsets of green will increase the luminance grey scale performance. Having two or more subsets in red further increases the luminance grey scale performance, but possibly to a lesser degree. It should be appreciated that having increases in any color, (e.g. red, green, or blue or any other primary color in a multiprimary system) increases the number of colors that may be represented without color quantization error. It should be appreciated that the embodiments and techniques described herein are applicable to multiprimary systems as they are to three primary (e.g. red, green, blue) systems.

The fixed pattern noise may be serendipitous, for example, the result of differences in subpixel parasitics. Alternatively, the fixed pattern noise may be deliberate, such as adjusting the aperture ratio of the subpixels. The difference in parasitics may be the result of shifting the position or size of the Thin Film Transistor (TFT) or storage capacitor in an active matrix liquid crystal display (AMLCD). The aperture ratio may be adjusted using any single or combination of adjustments to the design of the subpixels, most notably the 'black matrix' used in some LCD designs. The concept herein may be used on any suitable pixelated or subpixelated display however, monochrome or color.

Additionally, the fixed pattern noise may be large or small amplitude. If small, it may not have been visible without the matched quantizer; but the improvement in grey scale would still be realized with the matched quantizers. If the amplitude is large, the noise may be very visible, but with the matched quantizers, the noise may be substantially canceled, reduced to invisibility and the grey scale improved at the same time.

Also, there may be many forms of EO differences. One form is a linear shift, as might happen when the aperture ratio is different for the subsets. Another form is a shift in the shape of the EO curve, as might happen in a difference of parasitics. Both may be adjusted via the quantizing LUTs since the LUTs are a complimentary function.

In yet other embodiments, the use of multiple quantizers may be combined with high spatiotemporal frequency noise added to the large bit depth values to further increase the performance of the system. The combination of the two being greater performance than either alone. This provides an improved gamma (transfer function) adjustment with reduced quantization noise.

One embodiment may use a technique known in the art as "dither"—e.g. a fixed spatial pattern dither. That is to say, that the dither pattern does not move laterally or change brightness depth. While fixed pattern dither patterns are known in the art, those patterns may be used, together with the use of matched quantizer function generators as described herein.

Other forms of dither found in the art are known as "temporal dither" and "spatiotemporal dither". A temporal dither is created by switching between two brightness levels at a very rapid pace, higher than may be perceived by the Human Vision System. However, if the temporal switching rate is too slow, generally below 60 Hz, the temporal dither may be perceived as flicker. To reduce the appearance of flicker while still retaining the useful properties of temporal dither, the temporal dither may be combined with a spatial pattern. The result is "spatiotemporal dither" in which one subset of pixels or subpixels is at one brightness state while another subset is at a second brightness state, a spatial dither, but only for a given length of time after which the first subset of pixels or subpixels is switched to said second brightness state and the other said subset is switched to the said first brightness state, a temporal dither. The temporal frequency may be reduced below 60 Hz, yet not be visible to the Human Vision System, as is well known in the art.

A common form of spatiotemporal dithering is called in the art, "Frame Rate Control" or "FRC". Typically, such systems map the "true" grey levels of a display to the first N bits that match that number of grey levels (e.g. a six (6) bit greyscale driver's quantized output levels are mapped to the first, most significant, six bits of an eight (bit) quantized image data set). Any additional bit depth available in the image data set is used to select a predetermined spatiotemporal dither pattern (e.g. the least two significant bits of an eight bit quantized image may be used to select from three predetermined spatiotemporal dither patterns and a fourth value being assigned to the absence of a dither pattern). The patterns typically involve a very small repeat cell pattern to keep the spatial frequency of the pattern as high as possible to reduce pattern visibility.

One of the issues sometimes found in lower cost AMLCDs using Frame Rate Control is the visibility of spatiotemporal dithering artifacts. One of these artifacts is the uneven grey scale appearance of shaded objects that is the appearance of Mach bands or contours. The cause of this may be the fact that the grey band levels of the true, non-dithered, grey scale is adjusted to fit a desired gamma curve. But the dithered levels between are a linear interpolation between the true grey levels. Thus, the full transfer curve of the display using said linear interpolating spatiotemporal dithers exhibit a series of quantized points along straight line segments with the terminus of each segment following the desired logarithmic curve but the quantized points along each line segment lie along a chord in the interior of the desired logarithmic curve. Each point along the straight line segment exhibits a constant slope transfer curve. While every point at the terminus represent an abrupt change in slope. The human eye is very good at detecting changes to the slope of the shaded image. This is because the eye processes the image to send only the second and third derivatives of the image to the brain. The dithering artifact is detectable as lines in the third derivative of the image displayed, due to the abrupt change of slope at the terminus of each straight line segment.

One embodiment to take advantage of this human processing is to map both the non-dithered and dithered grey scale brightness levels with a matching quantizer as taught above. Another embodiment is to provide a dithering system that has more grey levels and map them using a matching quantizer, giving the further improvements as described above.

One embodiment for increasing the number of grey levels of predetermined spatiotemporal dither patterns is to use a larger span of the true grey levels to create additional intermediate grey levels; thus turning the problem into part of the solution.

Figure 8:
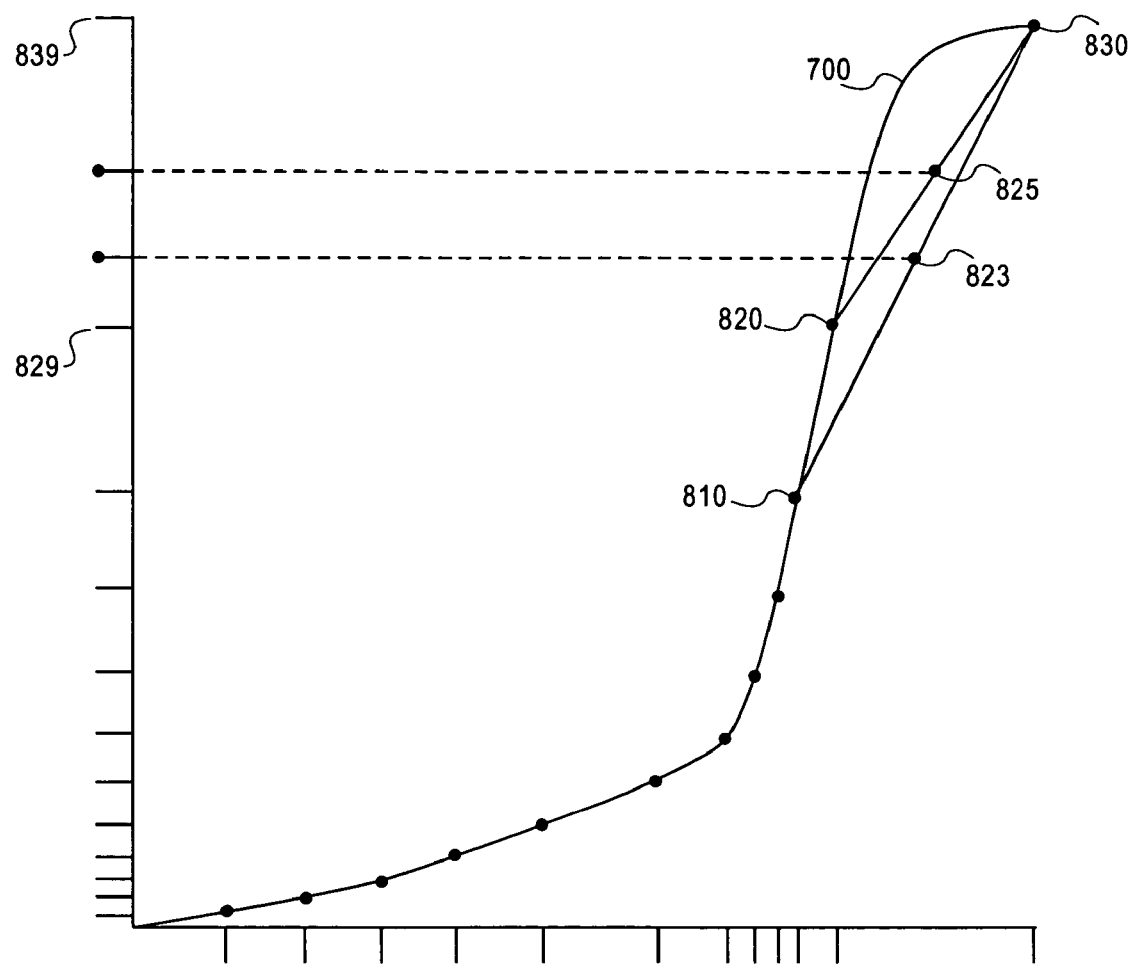
FIG. 8 shows the adjusted quanitized curve of FIG. 7B with chord lines upon which dithering between quantized outputs will produce additional quantized outputs.

If the non-dithered quantized output brightness grey levels were linear, equidistant on a line, these extra grey levels formed by dithering between non-adjacent quantization levels would be redundant, landing on the same levels as already provided by the non-dithered levels and or dithering between two near levels. But because the true grey levels are on a non-linear gamma curve, the intermediate levels of next nearest neighbor levels do not land on the same points as those provided by dithering between two nearest neighbor levels. This splitting of levels gives higher grey scale level performance and better gamma mapping. The typical spatiotemporal dither pattern alternates between two adjust true grey scale values. This is illustrated in FIG. 8, where a dither pattern alternates between the highest true value point 830 and the next true value point 820 below it. This results in the average perceived output brightness level 825, half way between the true quantized output brightness levels 829 and 839 that result from the points 820 and 830 on the transfer curve 700. Other points may be accessed with patterns of these two true values. The typical patterns are 1:3, 2:2, and 3:1. This gives four patterns when including 4:0. This is one of the simplest spatiotemporal patterns known in the art.

Larger numbers of grey scale levels are available for larger number of pixels or subpixels in the repeat pattern. However, as noted before, larger repeat cell patterns risk becoming visible to the Human Vision System. According to one embodiment of the present invention, it is possible to increase the grey scale levels available by increasing the span of the true grey scale levels used in the dither pattern. This increases the amplitude of the dither, but has the virtue of keeping the size of the repeat cell to a minimum. Also illustrated in FIG. 8 is a dither pattern that includes next nearest points 830 and 810 on the transfer curve 700. This dither results in the average perceived output brightness level 823 that is below the previously said level 825 but above the true level 829. Had the relationships of the three points 830, 820, and 810 been a linear one, the average perceived output brightness level 823 from the dither pattern would have been coincident with the true grey level 829. The example given included only two true grey values in the dither pattern. Additional patterns may include three true values. The example already given may be described as 2:0:2, for a four pixel or subpixel spatial repeat cell. Other examples may be: 1:1:2, 1:2:1, 2:1:1, etc. Other examples are of course possible and are contemplated within the scope of the present invention. With the additional perceived grey level available, the mapping of the internal image data set values to the display brightness levels may be made such that no mapping errors occur through the gamma pipeline and the internally generated values from image processing algorithm(s) is mapped to additionally available grey levels, reducing quantization noise as described above.

Using the extended spatiotemporal dither increases the number of grey levels available. However, they are not evenly spaced, nor follow the desired perceptually quantized logarithmic spacing. This is not a problem, one may map higher bit depth linear data space to the gamma curve via a table, the values of which are chosen to put each input data to the closest output value that corresponds with the nearest point on the desired output brightness level.

Dithering algorithms with random or pseudo-random noise added to a signal before quantization are also known in the art. To summarize the method known in the art:

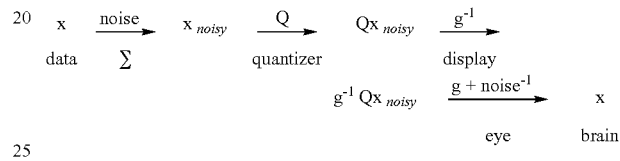

Image data that may be in either analog, non-quantized form, as from a CCD or vidicon imaging tube, or high bit depth digital (and thus previously quantized), has high frequency, low contrast, spatial or spatiotemporal noise added to it, which then undergoes quantization Q, reducing the bit depth of any particular data sample point, which the display then applies a gamma curve to, which when viewed by the eye and interpreted by the brain, the noise when filtered by the human eye's spatiotemporal response, noise$^{-1}$, converts, filters, the noisy quantization to continuous data which recovers the image and the eye responds to the display gamma as perceptually linearly. This system requires that the gamma of the display be very accurately matched to the quantizer, which may be located in a separate imaging system, to produce the proper response from the human vision system.

The following embodiment, made in accordance with the principles of the present invention, for use with the gamma pipeline may increase the number of grey scale values:

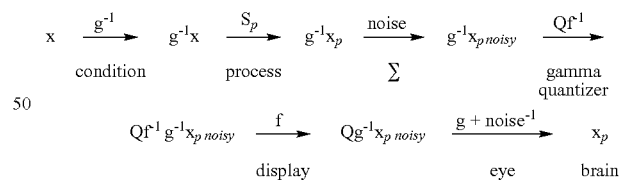

In such a system, the image data is conditioned with the desired gamma curve $g^{-1}$, which of course is actually mapping a previously perceptually quantized image data set to a deeper (higher) bit depth linear luminance data set, followed by image processing: e.g. subpixel rendering, scaling, or some other image transformation $S_p$, that desires the data possibly be in the linear luminance representation space. After all image processing, noise is added to the image, followed by a quantizing step that also includes the gamma correction function $Qf^{-1}$ for the display device. Getting to specifics of an example, the image may be 8 bit perceptually quantized image data set, which when preconditioned with the desired gamma curve is converted to a very precise and accurate 11 to 16 bit linear luminance data space as desired. The image processing may allow some of the eight (8) bit entropy to be converted, when filtered, to be expressed as real nine (9) to possibly eleven (11) bit image entropy data, still within the eleven (11) to sixteen (16) bits of linear luminance precision. However, the display may have only eight (8) bit, or even lower six (6) bit, drivers. The output gamma compensation look up table (LUT) or other function generator outputs the data as only eight (8) bits or six (6) bits as required by the display drivers. Thus, the output gamma compensation look up table (LUT) or other function generator may also serve as the quantizer. The output gamma compensation LUT has input to output mapping determined by the actual transfer function of the display device, thus giving a near ideal match to the display, as explained earlier above. Normally, in prior systems, the actual quantized gamma transfer curve of the display should be a very close approximation of the desired system gamma, since otherwise quantization errors will creep in and cause some image distortions. But with this system, the transfer function may be almost any monotonic transfer function since the added noise when quantized accurately to the display transfer function, may create a near ideal spatiotemporal dithering system that will allow the human eye to respond to the precision and accuracy of the gamma preconditioning and the entropy conversion, even when using lower bit depth drivers. There is still an advantage of using said close approximations however, in that the amplitude of the noise must match the amplitude of the local quantization spacing of the display. If the quantized output follows a substantially near ideal perceptually quantized output, then the amplitude of the noise desired is maintained at a constant perceptual contrast, as will be discussed further below.

The noise chosen for the system may be any that is deemed acceptable by the viewer. It may be blue noise, or a specific pattern, the larger and more complex, (without having low spatiotemporal components that would be objectionable when displayed) the better the overall performance of the system will be. However, there may be economic costs to larger, more complex noise sources. Therefore, it may be desirable to provide a commercially reasonable noise source for reducing quantization artifacts.

One additional embodiment may be to subtract the display's dynamic noise, which may contain undesirable low spatiotemporal contrast components that are visible, and therefore objectionable to the human eye. Such noise may include dot crawl or flicker caused by dot inversion or other operations in the display.

Spatiotemporal dithering is a common technique for increasing the bit depth of digitized flat panel displays. One method of generating such dithering is by creating a shaped noise pattern and adding it to the signal. Other prior art systems have used white noise, green noise, or blue noise. According to one embodiment, by creating a noise pattern that is specifically shaped by unsharp masking, the mask matching the spatial anti-chromatic aliasing filter for subpixel rendering to specific flat panel display color subpixel arrangements; the noise may be generated in only those chromatic spatial frequency components in which no luminance signal is present. This has the advantage of placing the spatiotemporal signal substantially on the chromatic channel of the panel, in the same spatial frequencies that are normally out of bounds for real signals. This may reduce the chance that the spatio-temporal dither pattern will mask any real signal on the display, keeping the real signal easily detected, free from adaptation by the human vision system. Further, since the unsharp masked noise is high spatio-temporal chroma signal, with very little, if any net luminance signal, the noise may be placed on color subpixels—that are specifically designed to be spaced closer together at a higher spatial frequency than can be resolved as separate colors. The chromatic noise will be "invisible" to the viewer. Thus, this noise is described in the art for convenience as "UV" for "UltraViolet". According to another aspect of the present invention, this noise signal is shaped by the unsharp mask such that the remaining chromatic noise signal substantially occurs in spatial frequencies that are filtered out by image signal filtering operations.

Figure 11A:
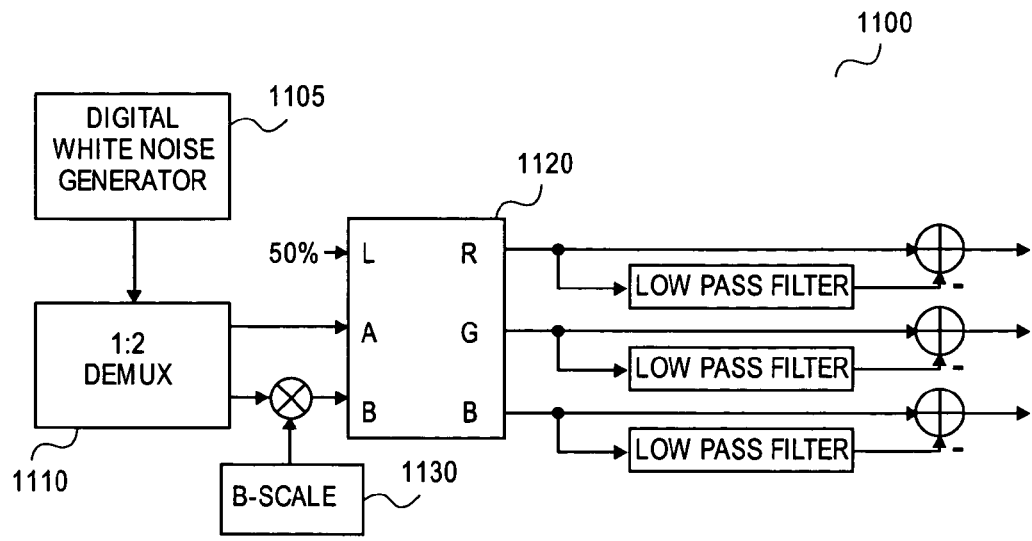
FIGS. 11A, 11B, and 11C are block diagrams showing a method of generating UV spatiotemporal noise for RGB, RGBW, and RGBCW color primary systems respectively.
Figure 11B:
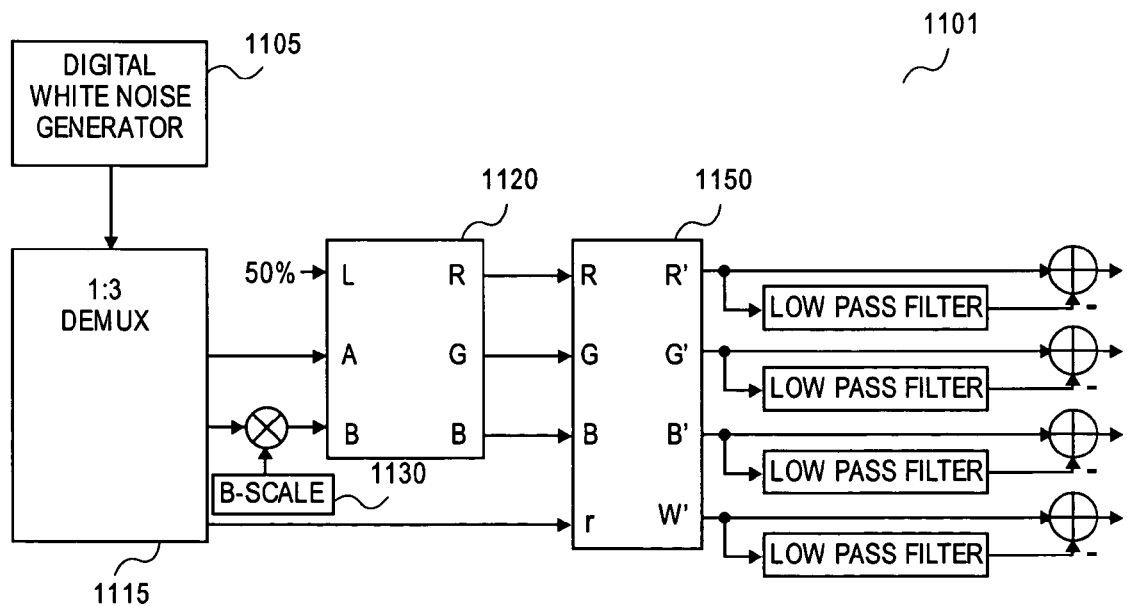
Figure 11C:
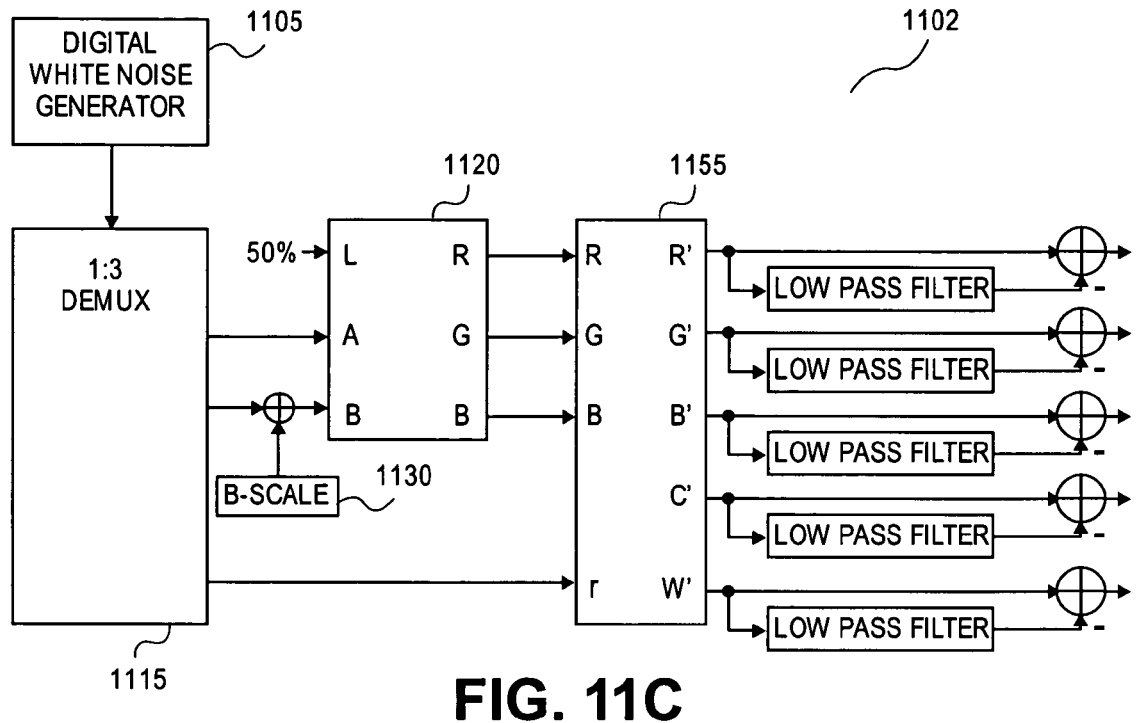

Examining FIGS. 11A, 11B, and 11C, the first step in the process of creating the "invisible noise" is to create two or three completely de-correlated digital white noise sources. One way of created these signals is to use a single pseudo-random number generator of the desired bit depth as a digital white noise generator 1105, and split the numbers into two or three streams, alternating between them using a demux function 1110 or 1115.

As shown in FIG. 11A, is a system 1100 for generating chromatic UV spatio-temporal noise for three primary, RGB, display systems, a white noise signal is generated from a single digital white noise generator 1105, then separated into two de-corralated white noise signals by a 1:2 demux function 1110. These two noise signals are fed to an LAB to RGB color space converter 1120. For better performance, the luminance coefficients of the color primaries used in the conversion algorithm, the color space transform matrix, may be made from measurements of the flat panel display upon which the "invisible noise" is to be displayed upon. This will reduce cross talk into the luminance channel. The luminance signal input of the converter is set to any suitable constant, for convenience here, 50%. The magnitude of the noise signal input to one of the color inputs to the LAB to RGB color space converter 1120 may be adjusted or scaled to allow for the blue to red/green luminance differences, which if unscaled would result in large amplitude noise on the B (blue) output signal. In FIG. 11A, the scaling is shown on the B input of the LAB to RGB color space converter. The scale factor may then be a fractional multiplier from the B-Scale function input 1130, reducing the B input value. The output of the conversion is stored as an N×M×P data set, representing an N'M sized "movie" of P frames length.

A further step may be to create an unsharp mask (i.e. passing the signal through a low pass filter) or, alternatively, to pass the signal through a high pass filter (not shown). The data set from the step above is filtered using a suitable smoothing filter. In this case, the smoothing filter may be very similar to the filter used to perform image signal filtering for subpixel rendering. This may create a reduced sample count data set that has been filtered to remove any signal that might alias with the pattern of color subpixels on the display in the case of subpixel rendering. Alternatively, the filter may be another smoothing, low pass filter. In yet another embodiment, it may be desirable that the movie be filtered temporally as well as spatially, so the filter may be three dimensional, overlapping the frames.

Since in operation, the "movie" may be spatio-temporally tiled on the display, and it may be undesirable to allow unfiltered changes across the boundaries of the tile, the movie may be tiled during the filter operation so that the unsharp mask may operate across the boundaries of the tile, both spatially and temporally. That is to say, that when filtering a value at the edge of the data set, the filtering operation may wrap around to sample the values on the other side of the data set. This may occur in some embodiments in all three axis and on all six faces, of the "movie" data set. This may ensure that there is no boundary between tiles.

The following spatio-temporal low pass filter kernel may be useful:

Frame P−1:

| 0 | 0.03125 | 0 |
|---|---|---|
| 0.03125 | .125 | 0.03125 |
| 0 | 0.03125 | 0 |

Frame P:

| 0 | 0.0625 | 0 |
|---|---|---|
| 0.0625 | 0.25 | 0.0625 |
| 0 | 0.0625 | 0 |

Frame P+1:

| 0 | 0.03125 | 0 |
|---|---|---|
| 0.03125 | .125 | 0.03125 |
| 0 | 0.03125 | 0 |

The resulting filtered movie sample may be subtracted from the original movie, each color plane, to produce a signed number "movie image" that contains only high spatio-temporal frequency UV noise. An average luminance level (for example, 50% or some suitable level) may be added back to the movie, to shift the negative half of the signal back to positive for storage as unsigned binary numbers. It should be noted that the resulting probability density function of spatio-temporal frequency of the noise will have been shifted from white to ultraviolet, all balanced to be invisible.

Also, it should be noted the similarity of the above filter with that used for area resampling subpixel rendering onto novel subpixel arrangements disclosed in the above incorporated by reference patent applications. According to one embodiment, using such similar filters to create the unsharp mask leaves only the high spatial frequency chromatic noise in the spatial frequencies that may be filtered out during subpixel rendering for those said novel subpixel arrangements. Thus the noise introduced does not interfere with desired signals in the resulting image formed by said subpixel rendering on said novel subpixel arrangements.

Herein has been described how to generate "invisible noise" for RGB displays. In that system, one proceeds by generating random colors that have a fixed luminosity. This is done because the human visual system is less sensitive to changes in chromaticity than in luminosity. The noise has to appear somewhere, so put it where human vision has difficulty seeing it. This is then followed by unsharp masking to ensure that the chromatic noise is substantially limited to high spatiotemporal frequencies.

In an RGBW, or any other Multi-Primary display, one may have an even better opportunity to hide the noise. In these displays, there is an ambiguity in the mathematics. There are many colors in RGBW that map to the same color as perceived by the human visual system. For example, if one increases the W in a color, one can compensate for this by lowering the R, G and B to produce the same color again. All the different combinations of RGBW that produce the same color are called metamers of that color. This creates an opportunity for one to do an even better job of hiding the noise. Instead of hiding it in only in chromaticity, it may be hidden in the metamers. Further, one may, according to another aspect of the present invention, use constant chromaticity input RGB colors, hiding the noise entirely in the metamers.

Figure 12A:
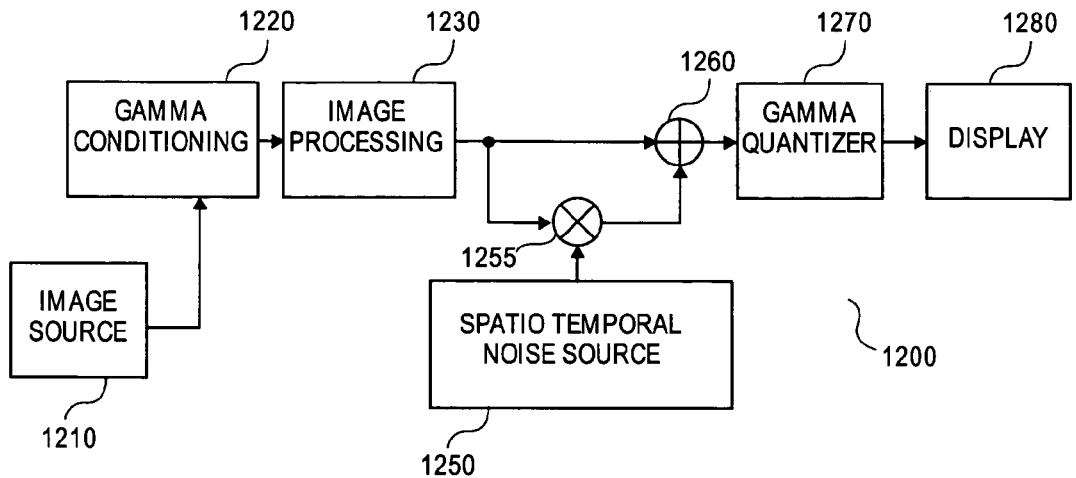
FIGS. 12A and 12B are a block diagram of an image processing system for a display using UV spatiotemporal noise.
Figure 12B:
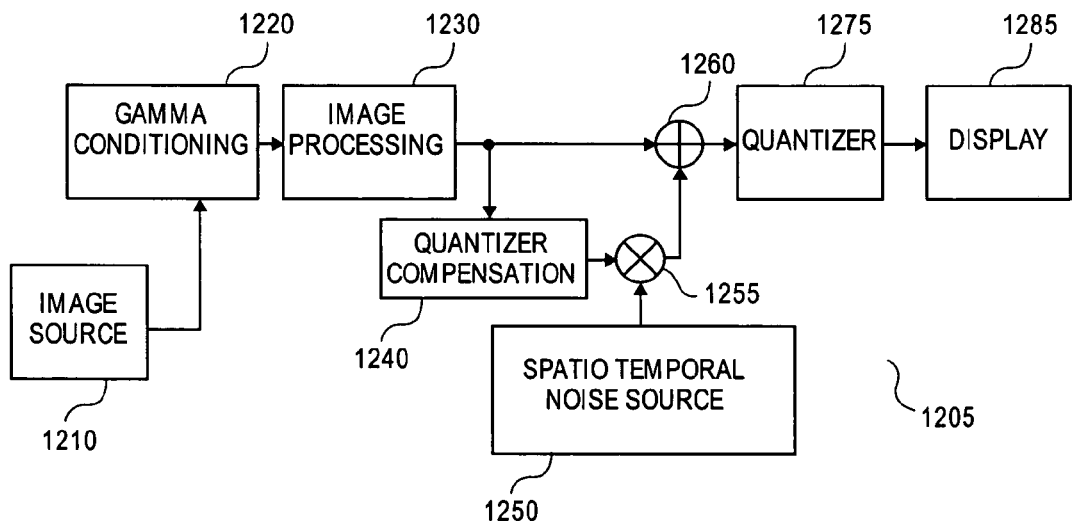

To generate noise for the RGB display one may start with random colors with a fixed luminosity as described above. To generate noise for RGBW one may start with very same constant luminosity RGB colors. Once converted to RGBW, one may add a random perturbation to the W of this random color and then modify the RG and B colors to compensate. The random perturbation may be positive or negative and may have a uniform or a Gaussian distribution. As in the RGB random noise generation, this will occasionally result in colors that are out of gamut. When this happens, one may discard the color and start over generating a new one until a valid metamer is found. These random metamers are used in the same way described above for RGB displays. To reiterate, they are collected into frames of a little noise "movie". The frames are low-pass filtered both in space and also in time from frame to frame in the movie. After the movie has been filtered in this way it is subtracted, pixel-for-pixel from an unfiltered copy of the movie to produce the final noise tables. The noise tables may be tiled across the input image and added to every pixel after image processing (including conversion to RGBW if necessary) and before the gamma quantization step as shown in FIGS. 12A and 12B.

One of the steps outlined above for the generation of random metamers is to modify the other primaries after the W primary has been randomly perturbed. In the case of RGBW there may be a linear relationship between a change in W and a compensating change to the other primaries. When a value r is added to W, the R primary must have the value $r^*m_R$ added to it, the G primary must have the value $r^*m_G$ added to it and the B primary must have the value $b^*m_B$ added to it. These three scale factors can be found by solving the following matrix equation:

$$W2X \cdot \left[ N + \begin{pmatrix} r \cdot m_R \\ r \cdot m_B \\ r \cdot m_g \\ r \end{pmatrix} \right] = W2X \cdot N \quad \text{Equation 1}$$

W2X is a matrix that converts RGBW colors into CIE XYZ tristimulus values. As discussed in the incorporated patent applications, this matrix can be generated from chromaticity and luminosity measurements of an RGBW display. N is a neutral gray color in RGBW values. Thus, a color perturbed by a random color (that may be a function of r), then converted to CIE XYZ should produce substantially the same CIE XYZ tristimulus values as converting the original color. The W2X matrix is a 4×3 matrix, however the process of solving the above equation boils down to three equations with three unknowns, $m_R$, $m_G$ and $m_B$, which may be solved using standard matrix algebra. Once these three scale factors are calculated for a given display, random metamers may be produced.

It should be noted that the above equation was written under the assumption that the W primary is modified by a random amount r and the other primaries were modified to compensate. Another embodiment may also be done by modifying any one of the other primaries instead and calculating the scale factors for the rest. It should also be appreciated that the above equation will work for any multi-primary system that has four primaries—e.g. RGBC (Red Green Blue and Cyan).

In the cases when the multi-primary system has more than four primaries, the equation is similar, but it may be desired to use a different approach. For example, consider an RGBCW display with Red, Green, Blue, Cyan and White primaries. In this case the equation would look like Equation 2:

$$M2X \cdot \left[ N + \begin{pmatrix} r \cdot m_R \\ r \cdot m_B \\ r \cdot m_g \\ r \cdot m_c \\ r \end{pmatrix} \right] = M2X \cdot N \qquad \text{Equation 2}$$

Where the M2X matrix that converts from RGBCW to CIE XYZ can still be generated from measurements of the display and the color N is now an RGBCW value. However, attempting to solve this equation symbolically in the traditional way will result in three equations and four unknowns ($m_R$, $m_G$, $m_B$ and $m_c$). This may not be solved because there is no single solution. However, any one of the many solutions is perfectly adequate for practical uses. A numerical solving program can find a set of scale factors that will work. In some embodiments, it may be desired to prevent the solver from finding "degenerate" solutions, for example cases where one or more of the scale factors goes to zero.

An alternate embodiment for finding metamers may not solve Equation 2 at all, but use a numerical solving software package to find metamers directly. For example, a numerical solver could solve the following equation:

$$M2X \cdot \begin{pmatrix} R \\ G \\ B \\ C \\ W + r \end{pmatrix} = M2X \cdot N \qquad \text{Equation 3}$$

Where W and r are supplied and the solver must find values for RGB & C that produce the color N in CIE XYZ values. Using a numerical solver like this may be too slow to use in the pipeline of a display. However this process can be done off-line beforehand to generate random noise tables, so the speed of the algorithm should not be an issue. In a modern PC, generating tens thousands of metamers this way could be done in seconds.

FIG. 11A shows how the random noise tables are generated for RGB. FIG. 11B is a similar figure showing how a digital chromatic high spatiotemporal frequency is designed for an RGBW display. As shown in FIG. 11B, this is a system 1101 for generating chromatic UV spatio-temporal noise for four primary, RGBW, display systems, a white noise signal may be generated from a single digital white noise generator 1105 then separated into three de-correlated white noise signals by a 1:3 demux function 1115. These two noise signals are fed to an LAB to RGB color space converter 1120. For best performance, the luminance coefficients of the color primaries used in the conversion algorithm, the color space transform matrix, are from measurements of the flat panel display upon which the "invisible noise" is to be displayed upon. This will reduce cross talk into the luminance channel. The luminance signal input of the converter is set to any suitable constant, for convenience here, 50%. The magnitude of the noise signal input to one of the color inputs to the LAB to RGB color space converter 1120 may be adjusted or scaled to allow for the blue to red/green luminance differences, which if unscaled may result in large amplitude noise on the B (blue) output signal. In FIG. 11B, the scaling is shown on the B input of the LAB to RGB color space converter. The scale factor may then be a fractional multiplier from the B-Scale function input 1130, reducing the B input value.

Figure 11D:
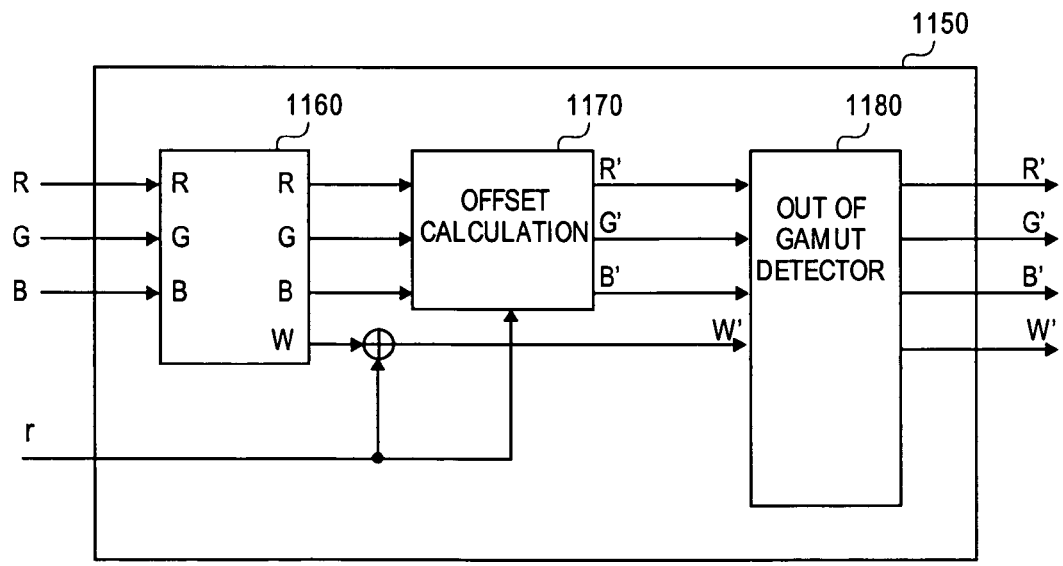
FIGS. 11D and 11E are block diagrams that expand on blocks in FIGS. 11B and 11C respectively.

Examining the operation of the RGBr to R'G'B'W' color space converter 1150 maybe made by referring to FIG. 11D. An RGB color is received and converted to an RGBW value by an RGB to RGBW color space converter 1160. A random number value r is received and added to the W value to produce W'. An offset calculation 1170 is done to compensate the RGB values for the change in W (using the $m_R$, $m_G$ and $m_B$ values calculated from Equation 1) to give tentative R'G'B'W' values. If this results in a color that is out of gamut then the Out of Gamut Test Detector 1180 causes the process to ignore the resulting color, waiting for the next color and random perturbation.

Once enough valid random metamers have been generated to fill all the frames of the random noise movie, the movie is low pass filtered and subtracted from a non-filtered copy of the movie to produce the final spatiotemporal noise sample.

As shown in FIG. 11C, this is a system 1102 for generating chromatic UV spatio-temporal noise for five primary, RGBCW, display systems, a white noise signal generated from a single digital white noise generator 1105 then separated into three decorralated white noise signals by a 1:3 demux function 1115. Two noise signals are fed to an LAB to RGB color space converter 1120. For best performance, the luminance coefficents of the color primaries used in the conversion algorithm, the color space transform matrix, are from measurements of the flat panel display upon which the "invisible noise" is to be displayed upon. This will reduce cross talk into the luminance channel. The luminance signal input of the converter is set to any suitable constant, for convenience here, 50%. The magnitude of the noise signal input to one of the color inputs to the LAB to RGB color space converter 1120 may be adjusted or scaled to allow for the blue to red/green luminance differences, which if unscaled would result in large amplitude noise on the B (blue) output signal. In FIG. 11C, the scaling is shown on the B input of the LAB to RGB color space converter. The scale factor may then be a fractional multiplier from the B-Scale function input 1130, reducing the B input value.

Figure 11E:
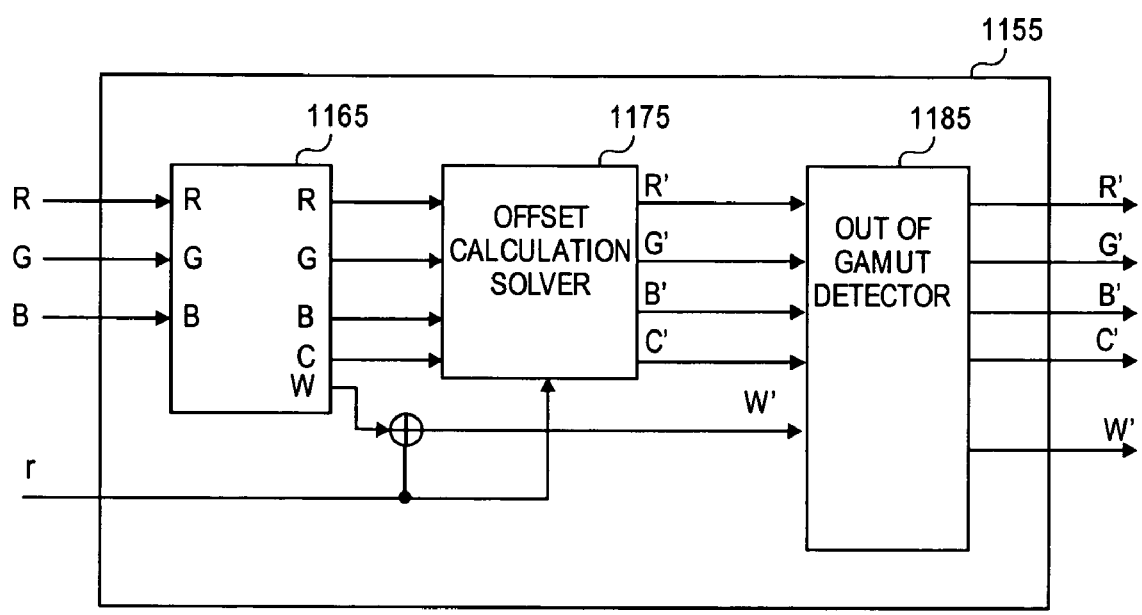

Examining the operation of the RGBr to R'G'B'C'W' color space converter 1155 may be made by referring to FIG. 11E. An RGB color is received and converted to an RGBCW value by an RGB to RGBW color space converter 1165. This converter may use an algorithm as disclosed in many of the incorporated patent applications or the like. A random number value r is received and added to the W value to produce W'. An offset calculation 1175 is done to compensate the RGBC values for the change in W to give tentative R'G'B'C'W' values. This may be done using scale factors calculated from Equation 2, or using a numerical solving package to directly find RGBC values as in Equation 3. If this results in a color that is out of gamut then the Out of Gamut Test Detector 1185 causes the process to ignore the resulting color, waiting for the next color and random perturbation.

The same process can be used to generate digital white noise for a display with any number of primaries. If the multi-primary display does not have a W primary, any one of the primaries can be used as the "base" primary that receives the random perturbation.

Once the random noise movie has been generated, it may be used substantially the same in any system, be it RGB, RGBW, RGBCW or any other multi-primary system. FIGS. 12A and 12B shows this, although in the case of RGBW and other multi-primary systems the image processing may include conversion from other color formats to the multiprimary color space. This conversion may be done before the spatio-temporal noise is added to the signal.

A tradeoff exists between the cost of storage of the UV noise "movie" verses the effective bit depth gain. The larger the "movie" the larger the theoretical effective bit depth gain. This comes at the cost of storage for greater sized movies. Another consideration is the possibility of visible artifacts due to the tiling of the noise movie causing spatiotemporal signals, in spite of the filtering operations. The ultimate noise movie is one that has the same dimensions as the image source to be displayed. This is potentially far too expensive for commercial systems. If one considers the human vision system has a peak spatial contrast sensitivity between five and ten cycles/°, the size of the noise sample should match or be slightly larger than one fifth of a degree on a given display. Samples much larger than this are likely to exhibit steeply diminishing returns. Movie samples smaller than this may exhibit undesired subharmonic spatial frequencies that may be visible. Further, small movie samples may not have sufficient distinct states with which to create distinct dithered grey levels as desired. Higher density displays thus may benefit from larger noise movies. The time depth of the sample may be chosen such that it is substantially at or longer than the peak spatiotemporal contrast sensitivity at 4 Hz. Thus, a good noise movie length for a display system at 60 Hz may be 15 or 16 frames to possibly 32 frames. Due to the filtering operation, one is reasonably assured that spatiotemporal frequencies at the lower limits of the noise movie size do not exist in the movie.

The invisible UV noise signal may be truncated to any desired bit depth, to match that needed in the gamma pipeline where it is to be used.

The amplitude of the noise may be adjusted to be high enough that the noise added to any particular image signal value may cause the quantizer to dither between two or more output quantization values. Note that for a perceptually encoding gamma quantizer, this noise amplitude may be bigger in the bright signal region and may be lower in the dark signal region. However, due to the human vision system being more sensitive to signals, including noise, in the dark signal region, a noise signal amplitude that is large enough to create a desired dither in the bright signal region may be objectionably visible in the dark signal region. Thus, it may be desirable to scale the amplitude of the noise signal before it is added to the image signal. Shown in FIG. 12A is a block diagram of an image processing system 1200 using spatiotemporal noise according to one embodiment. A previously perceptually quantized and encoded image from an image source 1210 is modified, gamma conditioned 1220 to convert the data set to a linear luminance representation which may then be operated upon by an Image Processing function 1230. At this point, the post processed image data is multiplied 1255 by the spatiotemporal noise from the spatiotemporal noise source 1250. The product of this multiplication is added 1260 to the post processed image data. The resulting noisy signal is perceptually quantized by a gamma quantizer function 1270 that may match the display 1280.

In the image processing system 1200 shown in FIG. 12A, the amplitude of the noise signal added to the post processed image source is approximately that required, because the perceptually encoding quantizer 1270 has monotonically increasing quantization intervals as the brightness of the signal increases. However, for the gamma pipeline that is to match the quantized output values of a non-ideal transfer curve display, such as that of FIG. 7A, it may be desirable to scale the amplitude of spatiotemporal noise to match the quantization interval for each image signal brightness domain. Shown in FIG. 12B is an image processing system 1205 that performs such non-ideal quantization interval scaling of the spatiotemporal noise amplitude using a new function, the Quantization Compensation function 1240. It may be implemented using an LUT, or other suitable function generator, that upon receiving an image data signal, outputs a value that is dependent upon (or is a function of) the quantization interval of the quantizer 1275 at that signal value.

As has already been noted regarding fixed dither patterns, the resulting brightness value perceived from the display may be shifted to another value other than the value desired due to the non-linear nature of the quantization interval progression. The actual values lie on the straight chord formed between the dithered points on the curved transfer curve of the display. The final result is a curve that lies inside the desired curve. It may be desirable to compensate for this by adjusting the quantization values by "exaggerating" the transfer curve, selecting quantization values that would match a curve with a greater gamma if the transfer curve is near ideal, or selecting quantization values with a greater second derivative for a non-ideal transfer curve. If the appropriate values are selected, the resulting transfer curve may closely approximate the desired perceptual transfer curve.

Combining several aspects of the present invention may prove beneficial. For example, combining multiple fixed spatial noise and quantization tables with the above spatio-temporal dithering system. Other combinations will come to mind to those knowledgeable in the art.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What claimed is:

1. A method of generating a spatial-temporal noise for a display system, the steps of said method comprising:
    creating a plurality of first image frames, each said first image frame comprising a plurality of random colors, said plurality of random colors having a substantially constant luminosity throughout said first image frame and a random chrominance component, said plurality of random colors forming a white noise;
    creating a plurality of second image frames, said second image frames comprising filtered image data from said plurality of said first image frames;
    creating a plurality of third image frames according to a function of said first and said second image frames.

2. The method of claim 1 wherein said constant luminosity value is approximately 50 percent.

3. The method of claim 1 wherein said random colors are generated in L*ab space with substantially constant L* and substantially random a and b values.

4. The method of claim 3 wherein said random colors are converted from L*ab to one of a group, said group comprising: ROB space, RGBW space, RGBCW space and multiprimary color space.

5. The method of claim 1 wherein the step of creating a plurality of second image frames further comprises low pass filtering image data from said first image frames.

6. The method of claim 5 wherein said low pass filtering is spatially filtering.

7. The method of claim 5 wherein said low pass filtering is temporal filtering.

8. The method of claim 5 wherein said low pass filtering is spatial temporal filtering.

9. The method of claim 5 wherein said low pass filtering further comprises filtering with wrap around image data.

10. The method of claim 9 wherein said wrap around data comprises with one image frame.

11. The method of claim 9 wherein said wrap around data comprises data from the first frame of said first image data frames and the last frame of said first image data frames.

12. The method of claim 1 wherein the step of creating a plurality of third image frames further comprises subtracting said first image frames from said second image frames.

13. The method of claim 12 wherein the data of said third image frames are shifted and stored as positive values.

14. A method of generating a spatial-temporal noise for a display system, the steps of said method comprising:
creating a plurality of first image frames, each said first image frame comprising a plurality of random colors;
creating a plurality of second image frames, said second image frames comprising filtered image data from said plurality of said first image frames;
creating a plurality of third image frames, said third image frames comprising a function of said first and said second image frames and wherein said first image frames is subtracted from said second image frames.

15. The method of claim 14 wherein the data of said third image frames are shifted and stored as positive values.

* * * * *

UNITED STATES PATENT AND TRADEMARK OFFICE
CERTIFICATE OF CORRECTION

PATENT NO. : 7,590,299 B2 Page 1 of 1
APPLICATION NO. : 10/866447
DATED : September 15, 2009
INVENTOR(S) : Brown Elliott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Twenty-first Day of September, 2010

David J. Kappos
*Director of the United States Patent and Trademark Office*